(12) United States Patent
Moriwaka

(10) Patent No.: US 7,842,565 B2
(45) Date of Patent: Nov. 30, 2010

(54) BEAM HOMOGENIZER AND LASER IRRADIATION APPARATUS

(75) Inventor: Tomoaki Moriwaka, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 84 days.

(21) Appl. No.: 12/266,742

(22) Filed: Nov. 7, 2008

(65) Prior Publication Data

US 2009/0068802 A1    Mar. 12, 2009

Related U.S. Application Data

(62) Division of application No. 11/391,232, filed on Mar. 29, 2006, now Pat. No. 7,486,444.

(30) Foreign Application Priority Data

Apr. 1, 2005   (JP)   ............... 2005-106392

(51) Int. Cl.
*H01L 21/84*   (2006.01)
(52) U.S. Cl. ............... 438/166; 257/E21.561
(58) Field of Classification Search ......... 438/151–166; 257/E21.561
See application file for complete search history.

(56) References Cited

U.S. PATENT DOCUMENTS

| | | |
|---|---|---|
| 4,769,750 A | 9/1988 | Matsumoto et al. |
| 4,988,188 A | 1/1991 | Ohta |
| 5,561,081 A | 10/1996 | Takenouchi et al. |
| 5,900,980 A | 5/1999 | Yamazaki et al. |
| 5,959,779 A | 9/1999 | Yamazaki et al. |
| 6,002,523 A | 12/1999 | Tanaka |
| 6,038,075 A | 3/2000 | Yamazaki et al. |
| 6,104,535 A | 8/2000 | Tanaka |

(Continued)

FOREIGN PATENT DOCUMENTS

DE   100 49 557   4/2002

(Continued)

OTHER PUBLICATIONS

Search Report (Application No. 06006435.9) dated Aug. 17, 2006.

(Continued)

*Primary Examiner*—Richard A. Booth
(74) *Attorney, Agent, or Firm*—Eric J. Robinson; Robinson Intellectual Property Law Office, P.C.

(57) ABSTRACT

The present invention provides a beam homogenizer for homogenizing energy distribution by making the distance between lenses small to shorten the optical path length with the use of an array lens of an optical path shortened type, and a laser irradiation apparatus using the beam homogenizer. The beam homogenizer is equipped with a front side array lens of an optical path shortened type whose second principal point is positioned ahead on a beam incidence side, a back side array lens of an optical path shortened type whose first principal point is positioned behind on a beam emission side, and a condensing lens, wherein the distance between the second principal point of the front side array lens and the first principal point of the back side array lens is equal to the focal length of the back side array lens.

12 Claims, 11 Drawing Sheets

U.S. PATENT DOCUMENTS

| | | | |
|---|---|---|---|
| 6,137,633 | A | 10/2000 | Tanaka |
| 6,176,926 | B1 | 1/2001 | Tanaka |
| 6,239,913 | B1 | 5/2001 | Tanaka |
| 6,246,524 | B1 | 6/2001 | Tanaka |
| 6,392,810 | B1 | 5/2002 | Tanaka |
| 6,567,219 | B1 | 5/2003 | Tanaka |
| 6,573,162 | B2 | 6/2003 | Tanaka et al. |
| 6,621,639 | B2 | 9/2003 | Kahlert et al. |
| 6,690,515 | B2 | 2/2004 | McCulloch et al. |
| 6,707,614 | B2 | 3/2004 | Tanaka |
| 6,856,630 | B2 | 2/2005 | Tanaka |
| 7,091,070 | B2 | 8/2006 | Imai et al. |
| 7,112,477 | B2 | 9/2006 | Tanaka |
| 7,169,630 | B2 | 1/2007 | Moriwaka |
| 2005/0055016 | A1 | 3/2005 | Tanaka et al. |
| 2005/0111105 | A1 | 5/2005 | Tanaka |
| 2005/0213218 | A1 | 9/2005 | Tanaka et al. |
| 2005/0254395 | A1 | 11/2005 | Tanaka et al. |

FOREIGN PATENT DOCUMENTS

| | | |
|---|---|---|
| EP | 1 122 020 | 8/2001 |
| JP | 2001-023920 | 1/2001 |
| JP | 2001-291681 | 10/2001 |
| WO | WO 01/61411 | 8/2001 |

OTHER PUBLICATIONS

Office Action (Application No. 06006435.9) dated Aug. 25, 2008.

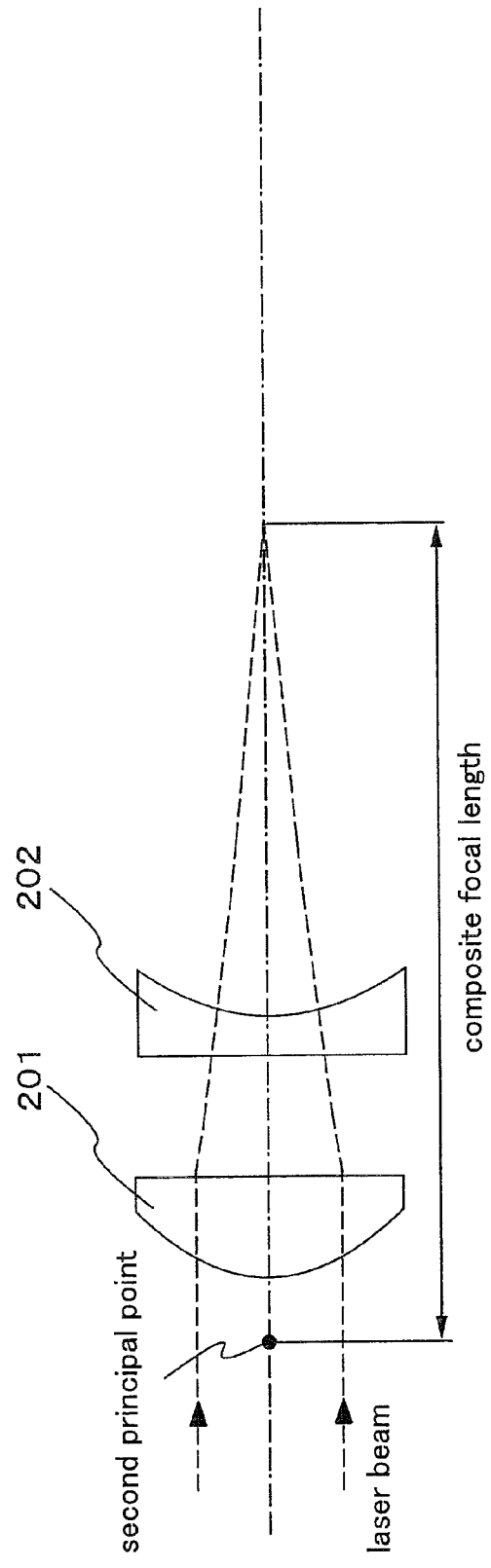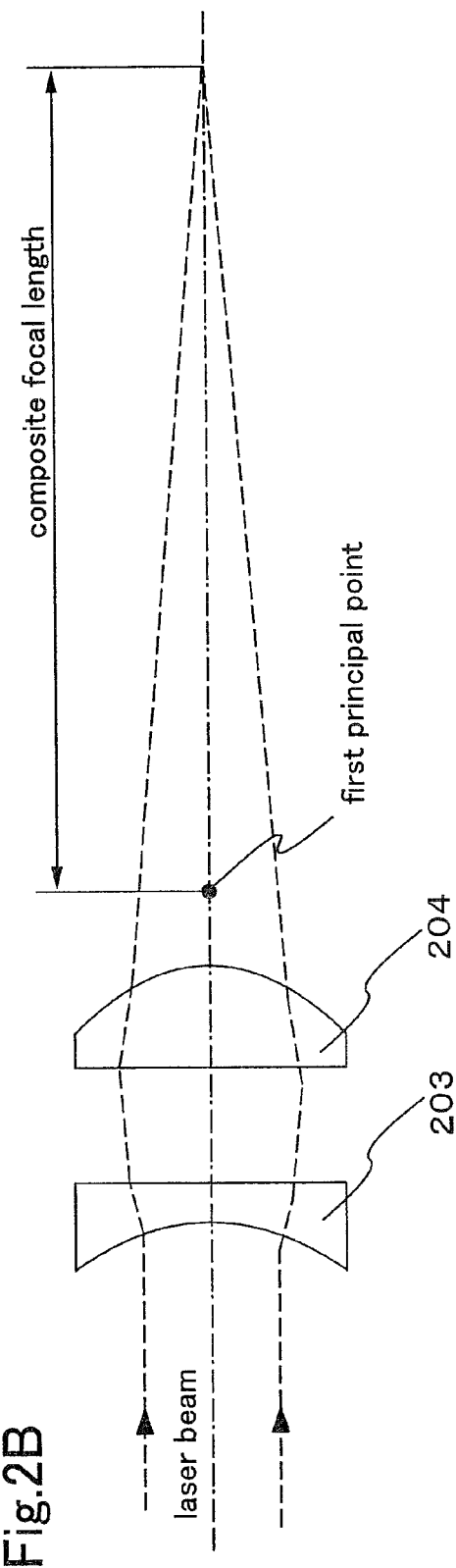

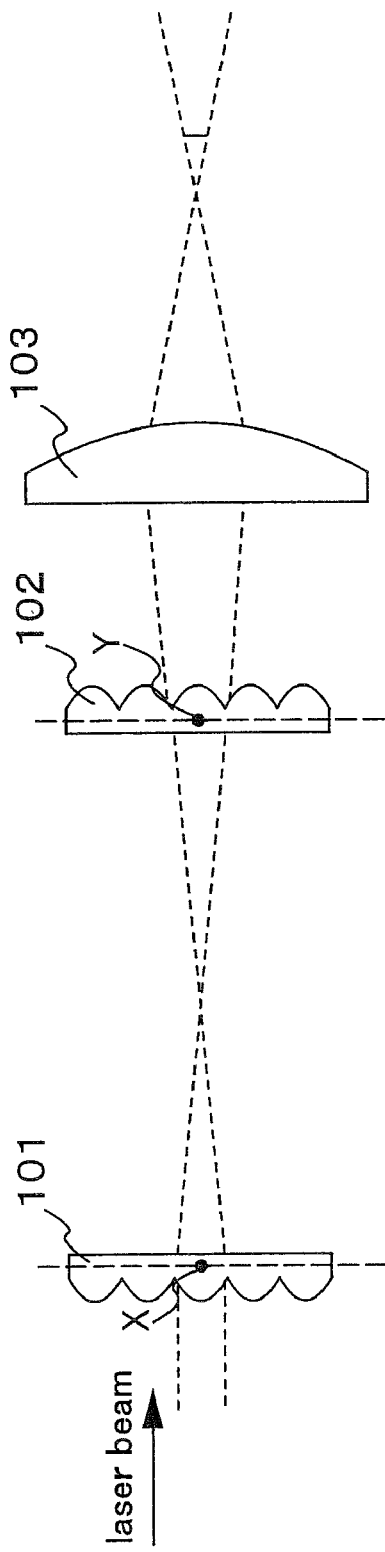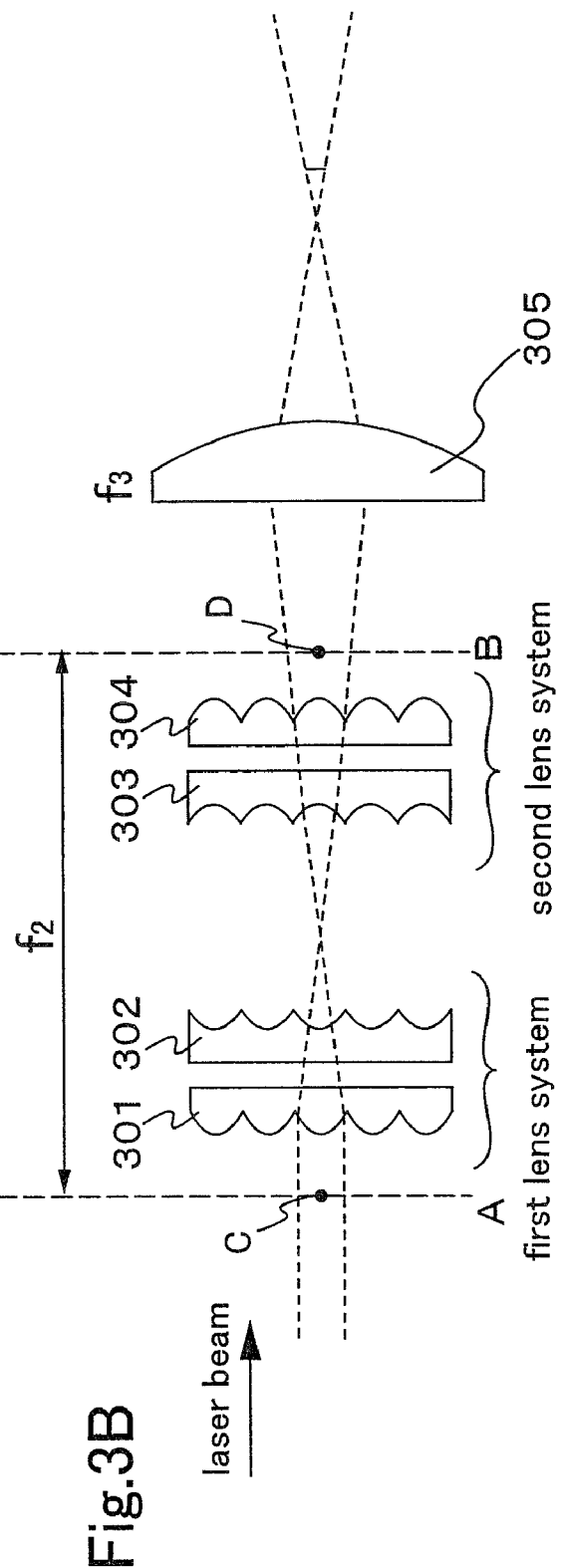

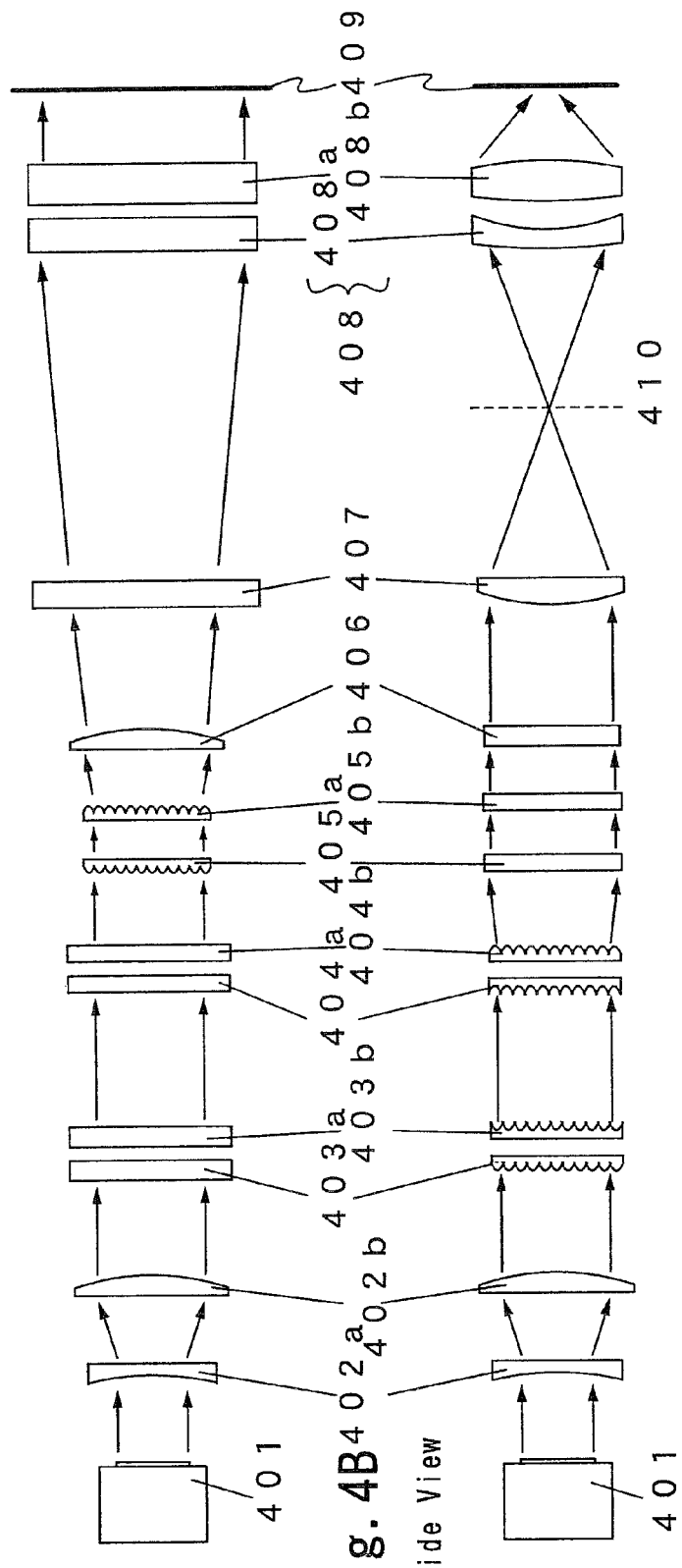
Fig. 4A Plan View
Fig. 4B Side View

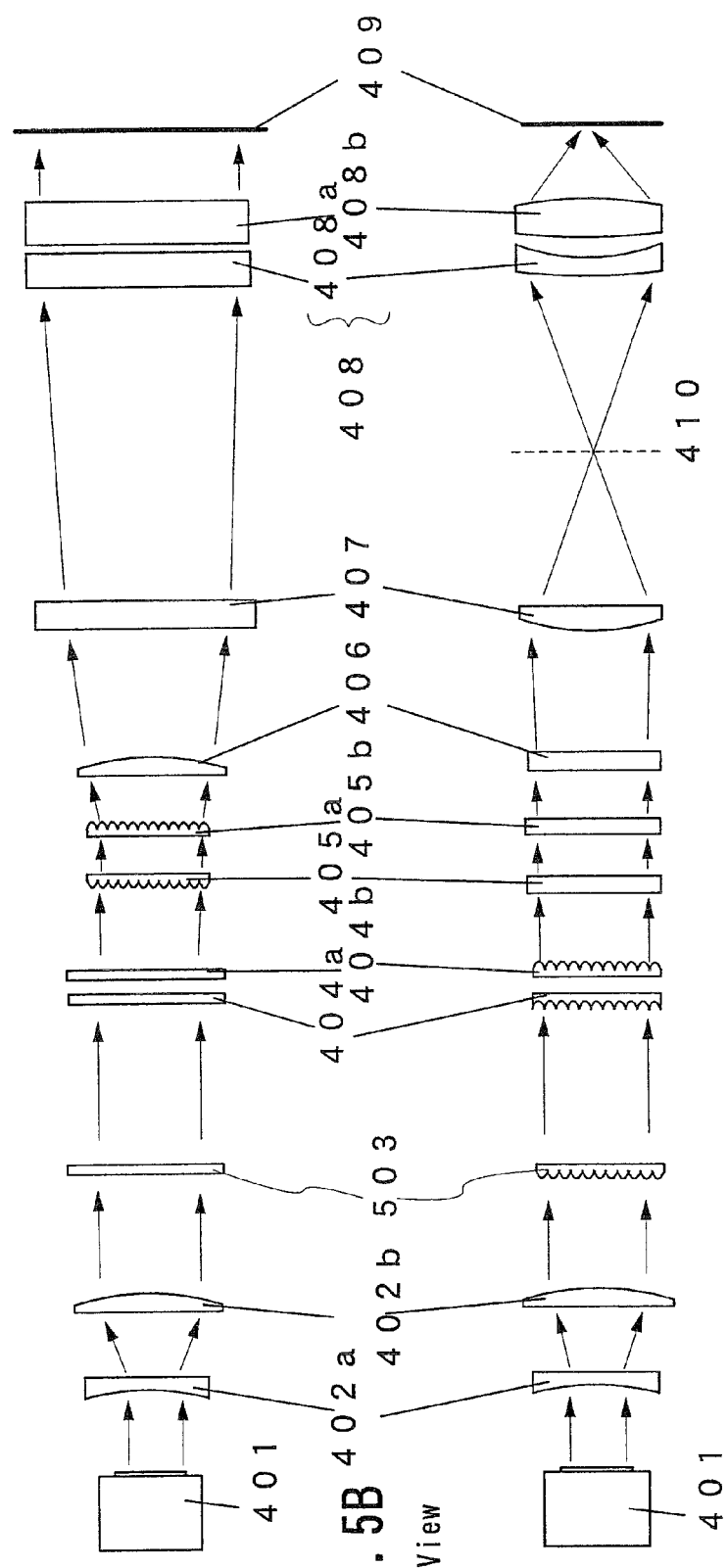
Fig. 5A Plan View
Fig. 5B Side View

Side View  Prior Art

Plan View  Prior Art

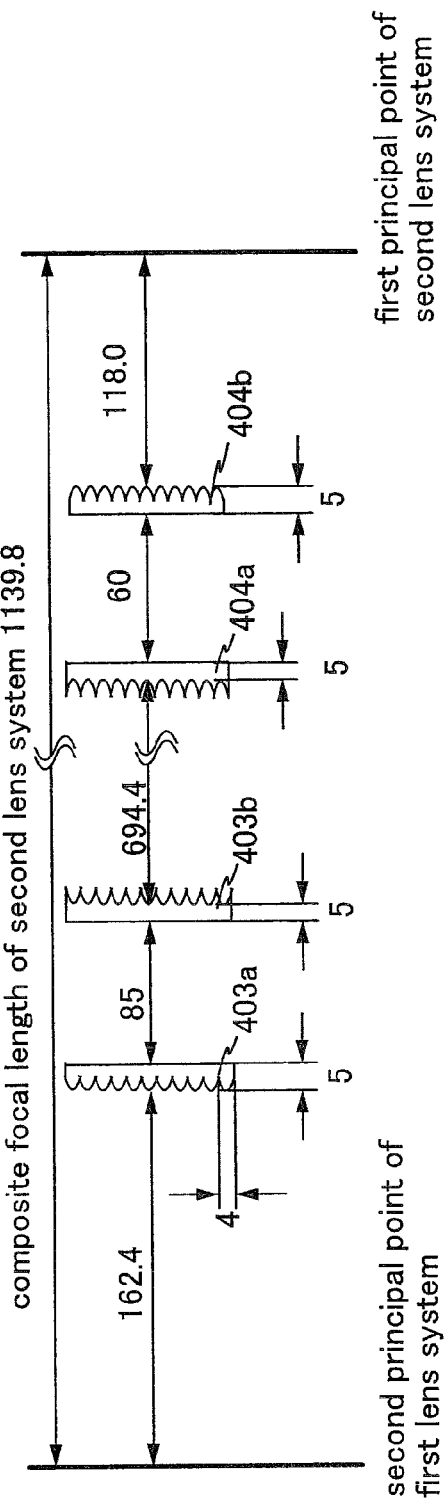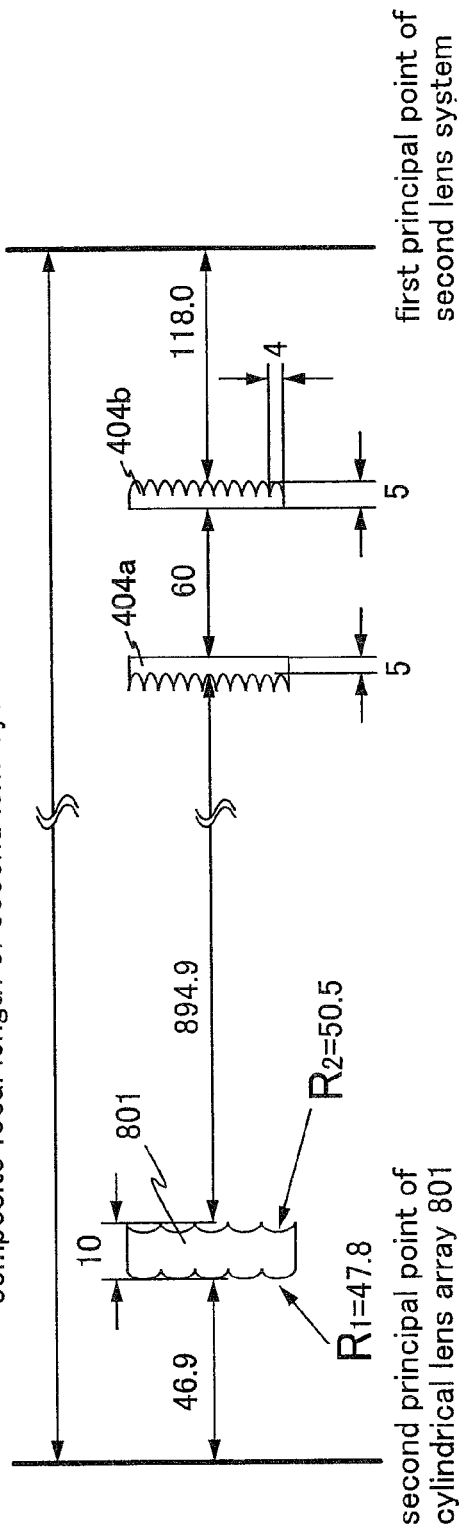
Fig.8A
Fig.8B

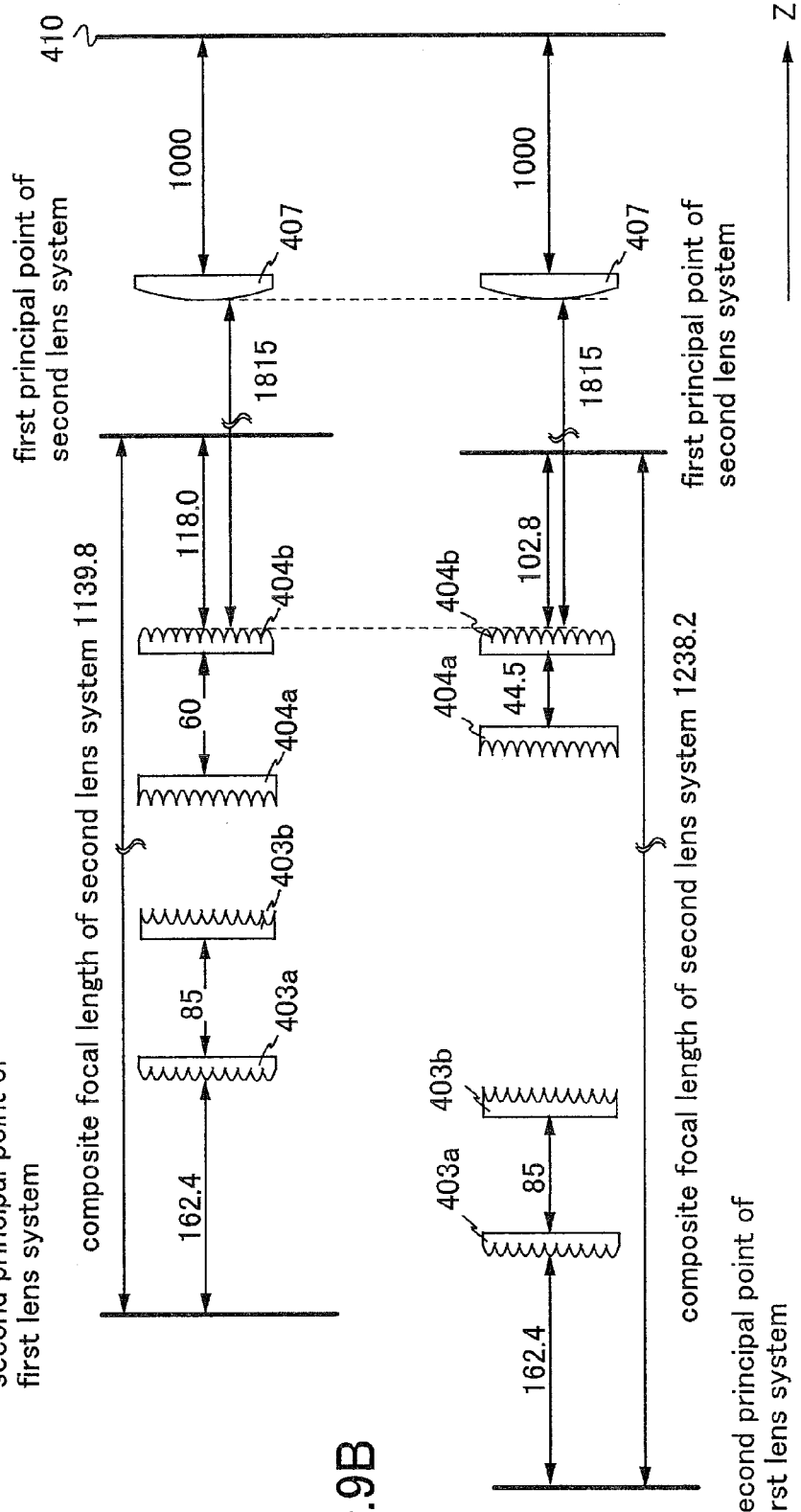

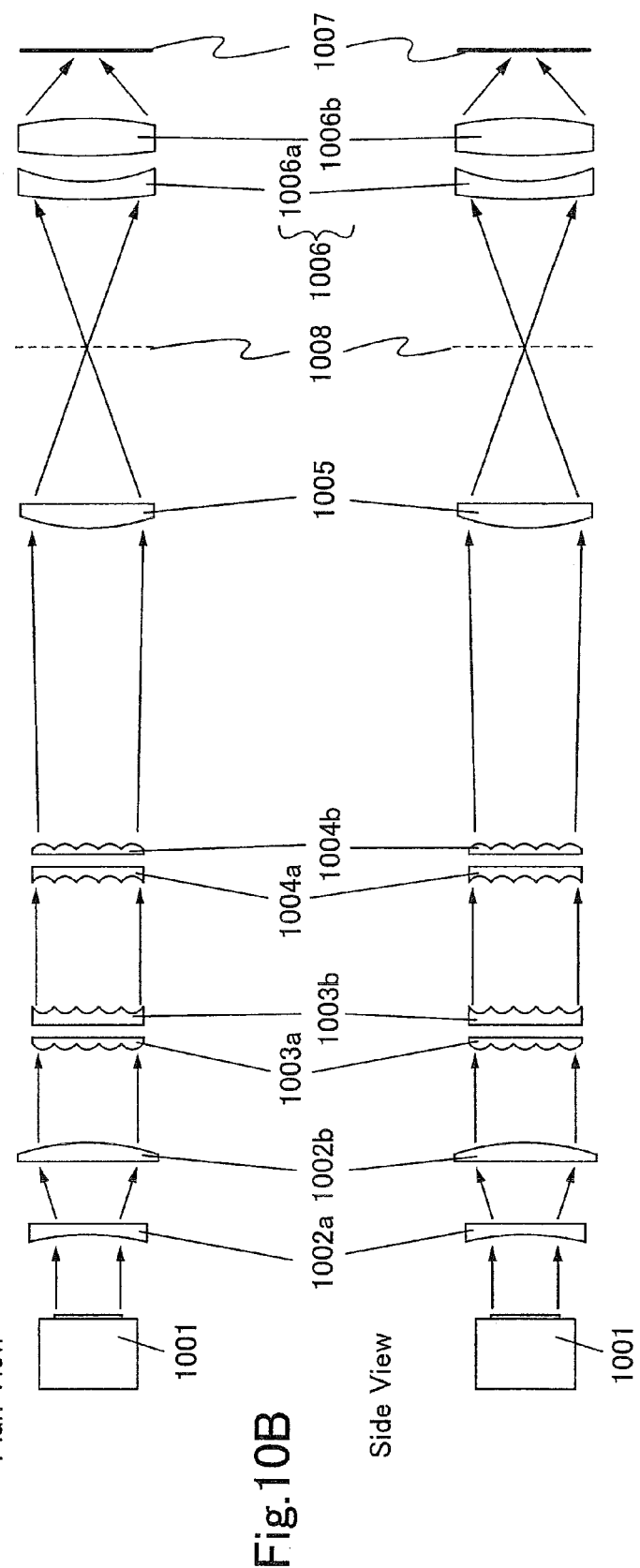
Fig. 10A Plan View
Fig. 10B Side View 11 elements 11 elements

BEAM HOMOGENIZER AND LASER IRRADIATION APPARATUS

BACKGROUND OF THE INVENTION

1. Field of Invention

The present invention relates to a beam homogenizer which homogenizes the energy distribution of a beam spot on an irradiation surface by using a more compact optical system, and also relates to a laser irradiation apparatus using the beam homogenizer. More specifically, the present invention relates to a beam homogenizer which homogenizes the energy distribution of a beam spot on an irradiation surface by using a more compact optical system obtained by decreasing the distance between lenses to shorten optical path length, and also relates to a laser irradiation apparatus using the beam homogenizer.

2. Description of the Related Art

In recent years, research has been widely conducted on techniques for carrying out laser annealing to a non-single crystal semiconductor film (an amorphous semiconductor film or a semiconductor film having crystallinity which is not single crystal, such as poly-crystal or microcrystal) formed over an insulating substrate such as a glass substrate. The laser annealing described herein indicates a technique for recrystallizing an amorphous layer or a damaged layer formed in a semiconductor substrate or a semiconductor film, and a technique for crystallizing a non-single crystal semiconductor film formed over a substrate. Moreover, the laser annealing includes a technique applied to modification or flattening of a surface of a semiconductor substrate or a semiconductor film, a technique in which laser irradiation is carried out after introducing a crystallization-promoting element such as nickel into an amorphous semiconductor film, a technique in which a semiconductor film having crystallinity is irradiated with a laser beam, and so on.

The laser annealing is employed for the crystallization because a glass substrate has a low melting point and a glass substrate is deformed when substrate temperature gets too high at the annealing. In contrast, a laser can give high energy only to a non-single crystal semiconductor film without changing the temperature of a substrate that much. As a laser annealing method, the following method is often employed because of its high mass productivity and industrial superiority: a laser beam emitted from a pulsed laser with high output power such as an excimer laser is shaped into a square spot with several centimeters on each side or into a rectangular spot with a length of 10 cm or more in a long-side direction on an irradiation surface through an optical system and an irradiation position of the beam spot is moved relative to the irradiation surface. It is to be noted that among the rectangular beam spots, a rectangular beam spot having a particularly high aspect ratio is referred to as a linear beam spot in this specification.

In particular, unlike a punctuate beam spot requiring to be moved from front to back and from side to side, a linear beam spot can provide high mass productivity because a large irradiation surface can be irradiated with the linear beam spot only by moving the linear beam spot in one direction perpendicular to a direction along a longer width of the linear beam spot. The laser beam is moved in the direction (hereinafter referred to as a short-side direction) that is perpendicular to the direction (hereinafter referred to as a long-side direction) along the longer width of the linear beam spot since this is the most effective scanning direction. Because of such high mass productivity, current laser annealing is mainly employing a linear beam spot obtained by shaping a beam spot of a pulsed excimer laser through an appropriate optical system.

FIGS. 6A and 6B show an example of an optical system for changing a sectional shape of a beam spot into a linear shape on an irradiated surface. The optical system shown in FIGS. 6A and 6B is an extremely general optical system. This optical system not only changes the sectional shape of the beam spot into a linear shape but also homogenizes the energy distribution of the beam spot on the irradiation surface at the same time. Generally, the optical system for homogenizing the energy distribution of the beam spot is referred to as a beam homogenizer.

The optical system shown in FIGS. 6A and 6B is also a beam homogenizer. In the case of using a XeCl excimer laser (wavelength 308 nm) as a light source, it is preferable to use quartz as a base material of the optical system. If another excimer laser with a shorter wavelength is used as a light source, it is preferable to use fluorite, $MgF_2$, or the like as the base material in order to obtain high transmittance.

FIG. 6A is a side view of a beam homogenizer for forming a linear beam spot. The side view includes in its paper a short-side direction of the linear beam spot formed by the beam homogenizer. A spot of a laser beam emitted from a laser oscillator 601, which is a XeCl excimer laser, is divided in one direction by cylindrical lens arrays 602a and 602b. If a mirror is inserted in the middle of the optical system, the short-side direction is bent in a direction of light bent by the mirror.

In this structure, the beam spot is divided into four beam spots. These spots are combined into one spot once by a cylindrical lens 604. The beam spots that have separated again are reflected on a mirror 606 and then condensed into one beam spot again by a doublet cylindrical lens 607 on an irradiation surface 608. The doublet cylindrical lens is a lens including two cylindrical lenses. This homogenizes the energy of the linear beam spot in its short-side direction and determines the length of the linear beam spot in its short-side direction.

FIG. 6B is a plan view of the beam homogenizer for forming the linear beam spot. The plan view includes in its paper a long-side direction of the linear beam spot formed by the beam homogenizer. The spot of the laser beam emitted from the laser oscillator 601 is divided in a direction perpendicular to the long-side direction by a cylindrical lens array 603. If a mirror is inserted in the middle of the optical system, the long-side direction is bent in a direction of light bent by the mirror.

In the structure of this lens array 603, the beam spot is divided into seven beam spots. After that, the seven beam spots are combined into one spot by a cylindrical lens 605 on the irradiation surface 608. An optical path after the mirror 606 is shown with dotted lines, and moreover the dotted lines show correct optical path and position of the irradiation surface in the case of not providing the mirror 606. This homogenizes the energy of the linear beam spot in its long-side direction and determines the length of the linear beam spot in its long-side direction.

As mentioned above, the cylindrical lens array 602a and the cylindrical lens array 602b and the cylindrical lens array 603 serve as lenses for dividing the spot of the laser beam. The homogeneity of the energy distribution of the obtained linear beam spot is determined based on the number of the divided beam spots.

In general, an excimer laser emits a rectangular laser beam having an aspect ratio of approximately 1 to 5. The spot of the laser beam has Gaussian intensity distribution where the intensity is higher toward the center of the spot. The optical system shown in FIGS. 6A and 6B changes the beam spot into a linear beam spot having homogeneous energy distribution with a size of 320 mm×0.4 mm.

The linear beam spot shaped by the above structure is delivered as being overlapped in such a way that the linear beam spot is displaced gradually in the short-side direction of the linear beam spot. Then, the laser annealing can be carried out to the whole surface of a non-single crystal semiconductor film so as to crystallize it or to enhance its crystallinity. In mass-production factories, currently, laser annealing is performed to semiconductor films using a linear beam spot shaped by the optical system as above. It is to be noted that some beam homogenizers include a reflecting mirror (for example, see Patent Document 1: Japanese Published Patent Application Laid-Open No. 2001-291681).

For several years, the size of a glass substrate has increased rapidly in a semiconductor device manufacturing process in order to form more semiconductor devices with one substrate and to improve mass productivity. With the increase in the size of the glass substrate, the improvement of laser annealing process capability by means of the extension of a linear beam in its long-side direction has been more strongly demanded. However, the extension of a linear beam in its long-side direction causes a problem in that the size of an optical system for forming the linear beam increases with the extension of the linear beam in its long-side direction, thereby increasing the area occupied by the optical system.

SUMMARY OF THE INVENTION

The present inventor has perfected the present invention as the result of concerted study directed towards eliminating this problem to provide a compact beam homogenizer for forming a rectangular beam, particularly a linear beam. Therefore, it is an object of the present invention to provide a beam homogenizer for homogenizing the energy distribution of a beam spot on an irradiation surface by using a more compact optical system, i.e., an optical system in which optical path length is shortened by decreasing the distance between lenses, and to provide a laser irradiation apparatus using the beam homogenizer.

As described above, the present invention is to provide a compact beam homogenizer for forming a rectangular beam, particularly a linear beam, and a laser irradiation apparatus using the beam homogenizer. The beam homogenizer according to the present invention uses an array lens of an optical path shortened type in which a principal point is set so that the optical path can be shortened and the beam homogenizer of the present invention can be roughly categorized into the following three modes according to its usage: a first mode where array lenses of an optical path shortened type are used as both array lenses at a front side and a back side, a second mode where an array lens of an optical path shortened type is used as only an array lens at a front side, and a third mode where an array lens of an optical path shortened type is used as only an array lens at a back side.

The array lens used in the present invention is an aggregation of lenses formed by connecting a plurality of small lenses and beams that have passed through the respective small lenses focus at the same position by passing through a condensing lens. The array lens is a generic term for a cylindrical lens array, a fly-eye lens, a crossed cylindrical lens array, and the like. The cylindrical lens array is sometimes referred to as a cylindrical array lens.

The respective beam homogenizers of the present invention are specifically shown hereinafter. A beam homogenizer of the first mode according to the present invention is equipped with a front side array lens of an optical path shortened type whose second principal point is positioned ahead on a beam incidence side, a back side array lens of an optical path shortened type whose first principal point is positioned behind on a beam emission side, and a condensing lens, wherein the distance between the second principal point of the front side array lens and the first principal point of the back side array lens is equal to the focal length of the back side array lens.

A beam homogenizer of the second mode according to the present invention is equipped with a front side array lens of an optical path shortened type whose second principal point is positioned ahead on a beam incidence side, a back side array lens of an optical path unshortened type, and a condensing lens, wherein the distance between the second principal point of the front side array lens and a first principal point of the back side array lens is equal to the focal length of the back side array lens. A beam homogenizer of the third mode according to the present invention is equipped with a front side array lens of an optical path unshortened type, a back side array lens of an optical path shortened type whose first principal point is positioned behind on a beam emission side, and a condensing lens, wherein the distance between a second principal point of the front side array lens and the first principal point of the back side array lens is equal to the focal length of the back side array lens.

In the beam homogenizer of the present invention that is categorized into the three modes, plural kinds of lenses, i.e., a combined array lens or an array lens having curved surfaces on its opposite sides can be used as the front side array lens and the back side array lens. As the combined array lens, plural kinds of arrays lenses, i.e., two or more cylindrical lens arrays or fly-eye lenses can be used. Moreover, as the array lens having curved surfaces on its opposite sides, any one of plural kinds of lens arrays, i.e., a cylindrical lens array, a fly-eye lens, and a crossed cylindrical lens array each having curved surfaces on its front and back sides can be used.

As the curved surface of each lens, either a convex surface or a concave surface can be used. At this time, it is preferable to use the same kind of lenses for the front side array lens and the back side array lens. For example, in the case of using a cylindrical lens array as an anterior lens of the front side array lens of an optical path shortened type, it is preferable to use cylindrical lens arrays of the same kind for all of a posterior lens of the front side array lens, and anterior and posterior lenses of the back side array lens. Moreover, as the condensing lens, any one of a cylindrical lens, a toric lens, and a crossed cylindrical lens can be used.

Thus, many modes are applicable to the beam homogenizer of the present invention. The modes of the beam homogenizer of the present invention are more specifically described hereinafter. As an array lens of an optical path shortened type of the beam homogenizer of the present invention, a cylindrical lens array can be employed as described above, and in this case, it is preferable that, in the first mode, the front side array lens of an optical path shortened type and the back side array lens of an optical path shortened type each includes two cylindrical lens arrays, a curved surface of an anterior cylindrical lens array of the front side array lens is convex, a curved surface of a posterior cylindrical lens array of the front side array lens is concave, a curved surface of an anterior cylindrical lens array of the back side array lens is concave, and a curved surface of a posterior cylindrical lens array of the back side array lens is convex.

In the second mode, it is preferable that the front side array lens of an optical path shortened type includes two cylindrical lens arrays, a curved surface of an anterior cylindrical lens array of the front side array lens is convex, a curved surface of a posterior cylindrical lens array of the front side array lens is concave, and the back side array lens of an optical path unshortened type is a cylindrical lens array. Moreover, in the third mode, it is preferable that the front side array lens of an optical path unshortened type is a cylindrical lens array, the back side array lens of an optical path shortened type includes two cylindrical lens arrays, a curved surface of an anterior cylindrical lens array of the back side array lens is concave, and a curved surface of a posterior cylindrical lens array of the back side array lens is convex.

Moreover, as the array lens of an optical path shortened type of the beam homogenizer of the present invention, a fly-eye lens array can be used as described above. In this case, in the first mode, it is preferable that the front side array lens of an optical path shortened type and the back side array lens of an optical path shortened type each includes two fly-eye lenses, a curved surface of an anterior fly-eye lens of the front side array lens is convex, a curved surface of a posterior fly-eye lens of the front side array lens is concave, a curved surface of an anterior fly-eye lens of the back side array lens is concave, and a curved surface of a posterior fly-eye lens of the back side array lens is convex.

In the second mode, it is preferable that the front side array lens of an optical path shortened type includes two fly-eye lenses, a curved surface of an anterior fly-eye lens of the front side array lens is convex, a curved surface of a posterior fly-eye lens is concave, and the back side array lens of an optical path unshortened type is a fly-eye lens. Further, in the third mode, it is preferable that the front side array lens of an optical path unshortened type is a fly-eye lens, the back side array lens of an optical path shortened type includes two fly-eye lenses, a curved surface of an anterior fly-eye lens of the back side array lens is concave, and a curved surface of a posterior fly-eye lens of the back side array lens is convex.

As the array lens of an optical path shortened type in the beam homogenizer of the present invention, a cylindrical lens array having curved surfaces on its opposite sides can be used as described above. In this case, in the first mode, it is preferable that the front side array lens of an optical path shortened type and the back side array lens of an optical path shortened type each includes a cylindrical lens array having curved surfaces on its opposite sides, an anterior curved surface of the front side array lens is convex, a posterior curved surface thereof is concave, an anterior curved surface of the back side array lens is concave, and a posterior curved surface thereof is convex.

In the second mode, it is preferable that the front side array lens of an optical path shortened type includes a cylindrical lens array having curved surfaces on its opposite sides, an anterior curved surface of the front side array lens is convex, a posterior curved surface thereof is concave, and the back side array lens of an optical path unshortened type is a cylindrical lens array having a curved surface on one side. Further, in the third mode, it is preferable that the front side array lens of an optical path unshortened type is a cylindrical lens array having a curved surface on one side, the back side array lens of an optical path shortened type is a cylindrical lens array having curved surfaces on its opposite sides, an anterior curved surface of the back side array lens is concave, and a posterior curved surface thereof is convex.

A laser irradiation apparatus of the present invention is equipped with the beam homogenizer of various kinds of modes described above and a stage. The beam homogenizer homogenizes energy density distribution of an irradiation beam in its short-side and long-side directions, and the irradiation beam with the energy density distribution homogenized in the both directions is projected to an irradiation surface provided over the stage. Alternatively, the beam homogenizer homogenizes the energy density distribution of an irradiation beam in one of its short-side and long-side directions and then homogenizes the energy density distribution of the irradiation beam in the other direction, and the irradiation beam with the energy density distribution homogenized in the both directions is projected to an irradiation surface provided over the stage.

In the beam homogenizer of the present invention, by using the beam homogenizer equipped with each kind of array lens of an optical path shortened type including a lens system in which a convex lens and a concave lens are combined or the like, the position of a principal point of the lens system can be changed on purpose, whereby the distance between the lenses can be made short. Accordingly, the optical path length can be shortened. Therefore, it is possible to form a rectangular beam spot, particularly a linear beam spot, with homogeneous energy distribution on an irradiation surface by a more compact optical system. In the present invention, by using the beam homogenizer of the present invention in a laser irradiation apparatus, the space occupied by the optical system in the apparatus can be reduced, so that a more compact laser irradiation apparatus with smaller foot print can be provided.

BRIEF DESCRIPTION OF THE DRAWINGS

In the accompanying drawings:

FIGS. 2A and 2B show a first principal point and a second principal point of a combined lens of a convex lens and a concave lens, and composite focal length of the combined lens;

FIGS. 3A and 3B schematically show a beam homogenizer of the present invention;

FIGS. 4A and 4B show a laser irradiation apparatus of the present invention;

FIGS. 5A and 5B show another mode of a laser irradiation apparatus of the present invention;

FIGS. 8A and 8B show Embodiment 3;

FIGS. 9A and 9B show Embodiment 4;

FIGS. 10A and 10B show Embodiment 5; and

DETAILED DESCRIPTION OF THE INVENTION

Embodiment Mode

Figure 1:
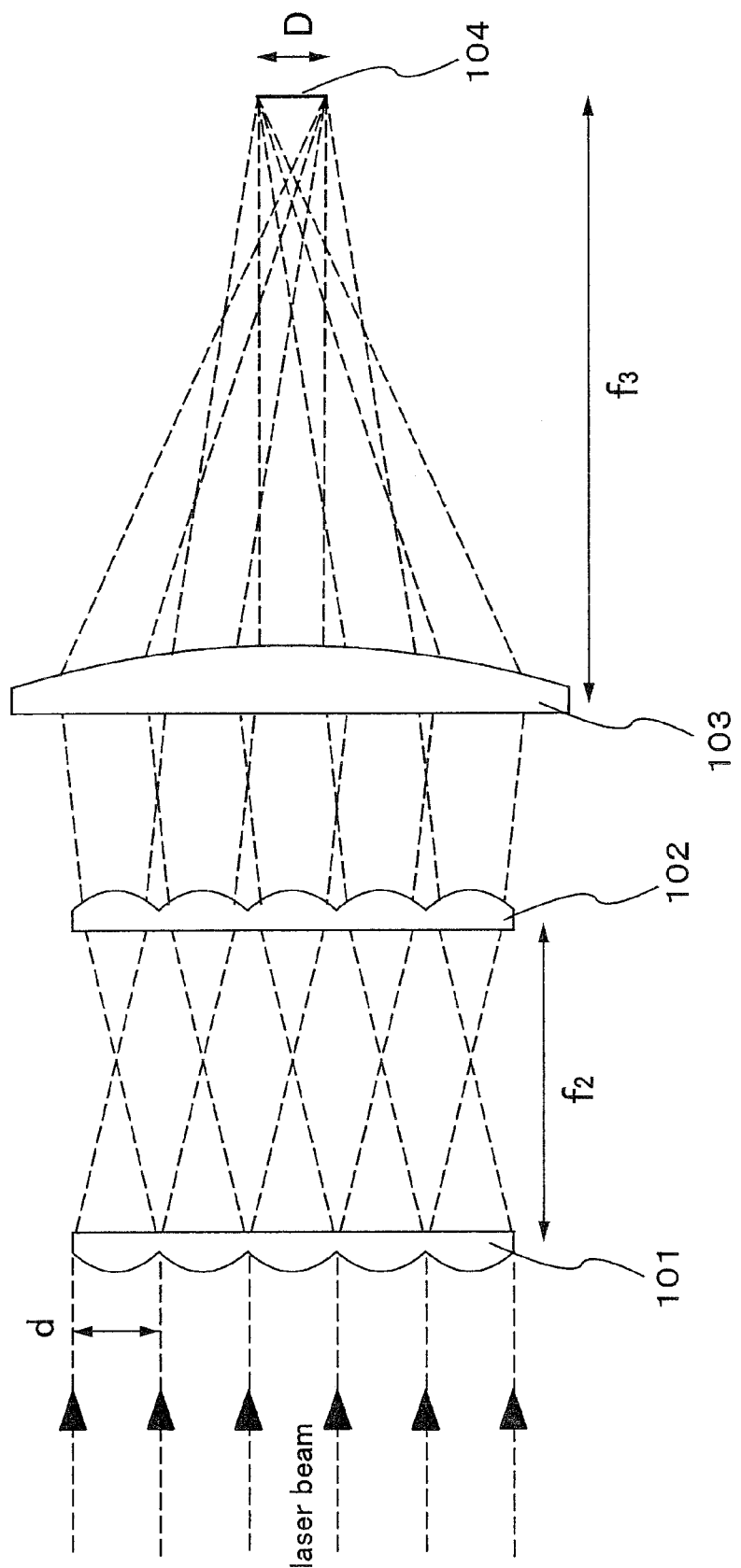
FIG. 1 schematically shows a beam homogenizer.
Figure 6A:
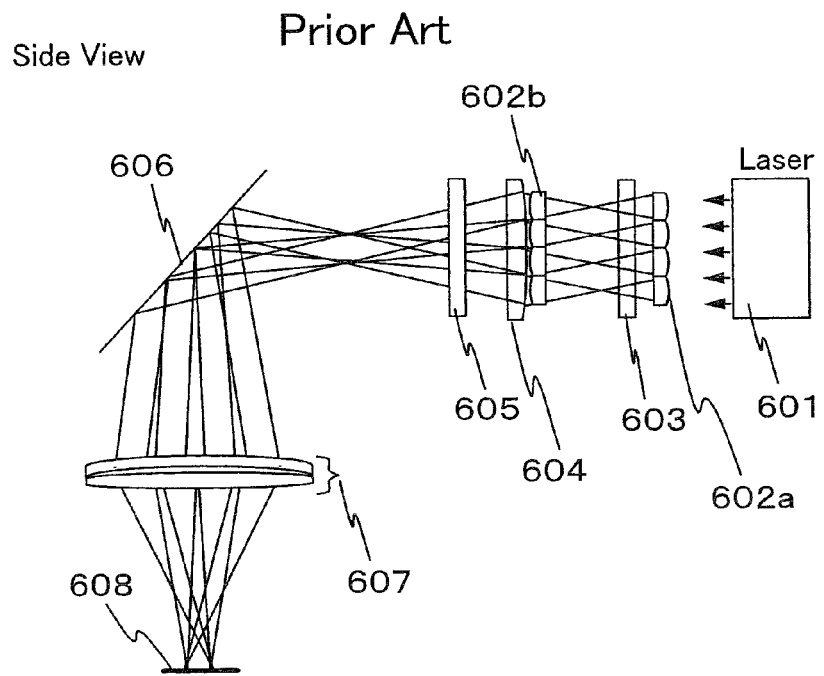
FIGS. 6A and 6B show a laser irradiation apparatus described in the Related Art.
Figure 6B:
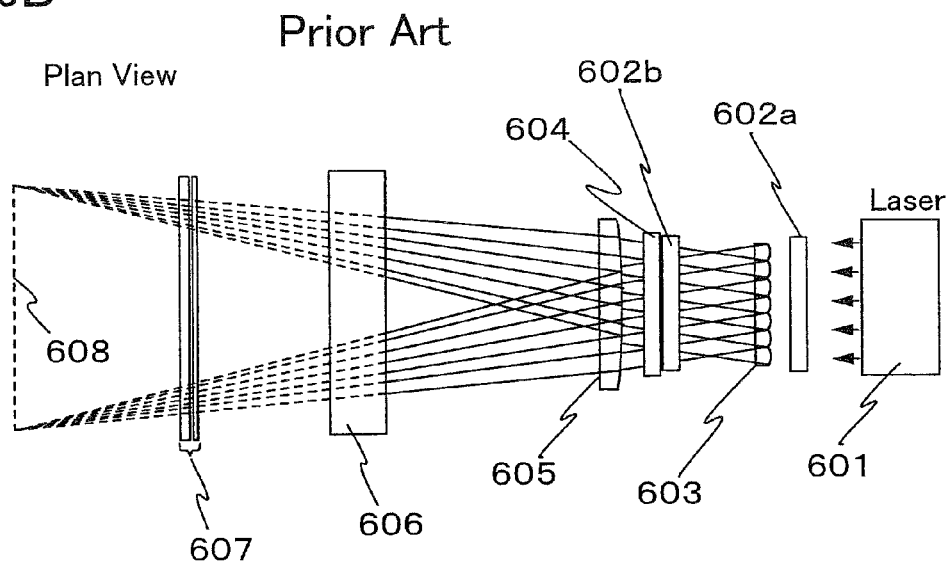

In Embodiment Mode of the present invention, a beam homogenizer using a cylindrical lens array and a cylindrical lens is described first with reference to FIG. 1. A cylindrical lens array has a plurality of cylindrical lenses arranged in a direction of their curvatures, and has a role of dividing an incident beam into the same number of beams as the number of cylindrical lenses. As shown in FIG. 1, a cylindrical lens array 102 with a focal length of f2 is arranged so as to have a distance of f2 from a cylindrical lens array 101 with a focal length of f1. It is noted that f1 is smaller than f2. Thus, incident light is divided into five.

Here, the distance between the cylindrical lens arrays 101 and 102 means the distance from a second principal point of the cylindrical lens array 101 to a first principal point of the cylindrical lens array 102. A technical definition of the first principal point and the second principal point is later described. The light which has been divided into five by the cylindrical lens arrays 101 and 102 are combined by a cylindrical lens 103 with a focal length of f3 on an irradiation surface 104 arranged at a distance of f3 behind the cylindrical lens 103, at which the energy distribution is homogenized. In FIG. 1, the light is divided into five; however, the homogeneity of the energy distribution increases as the division number increases.

By arranging the optical system as shown in FIG. 1, a top surface of each cylindrical lens of the cylindrical lens array 101 is optically in a conjugate positional relation with the irradiation surface 104, whereby an image on the top surface is projected to the irradiation surface 104. In other words, the irradiation surface 104 is irradiated uniformly by the respective cylindrical lenses of the cylindrical lens array 101. It is natural that the sum of the energy distribution of the laser beams from all the cylindrical lenses of the cylindrical lens array is also homogeneous.

Therefore, even though the energy distribution is inhomogeneous depending on a position or an orientation of light entering the whole surface of the cylindrical lens array, it is possible to obtain a beam with homogeneous energy distribution on an irradiation surface by using the beam homogenizer shown in FIG. 1. At this time, the length D of the beam spot formed on the irradiation surface 104 is determined by the following formula (1) where d is the width of the cylindrical lens of the cylindrical lens array.

$$D = (f3/f2)d \quad \text{formula (1)}$$

The distance between the cylindrical lens array 102 and the cylindrical lens 103 does not depend on other parameters and can be freely determined.

As thus described, it is understood that a linear beam with homogeneous energy distribution can be formed by using the optical system shown in FIG. 1 both in the long-side direction and the short-side direction of the linear beam. At that time, after the linear beam is homogenized in the short-side direction, the linear beam may be homogenized in the long-side direction, or the order may be opposite. If the linear beam is homogenized in the long-side direction first, a stripe pattern parallel to the short-side direction may appear on the irradiation surface; therefore, it is preferable that the energy distribution thereof in the short-side direction is homogenized first and then the energy distribution thereof in the long-side direction is homogenized.

In consideration of the above, for example, when designing a beam homogenizer for the long-side direction in order to form a linear beam which is very long in the long-side direction, f3 in the formula (1), which is the focal length of the cylindrical lens 406, is made small. However, this means that the beam is extended suddenly in a short distance, which makes it difficult to homogenize the energy distribution in the long-side direction sufficiently. Therefore, it is necessary to secure distance for extending the beam spot in the long-side direction (distance from a second plane of the cylindrical lens 406 to the irradiation surface). Accordingly, the focal length of the condensing lens in the short-side direction (cylindrical lens 407) needs to be extended. The width of the beam spot in the short-side direction is determined by the formula (1).

According to the formula (1), when f3 (the focal length of the cylindrical lens 407) is increased, it is necessary to increase f2 (the composite focal length of the cylindrical lens arrays 404a and 404b). As thus described, it is understood that size reduction of the optical system for homogenizing the energy distribution in the short-side direction is effective to reduce the size of the entire optical system. Therefore, when a linear beam with longer length in the long-side direction is to be formed, it is necessary to decrease f2 of the optical system for homogenizing the energy distribution in the short-side direction as derived from the formula (1).

In FIGS. 4A and 4B, decreasing f2 (the composite focal length of the cylindrical lens arrays 404a and 404b) in the optical system means nothing less than decreasing the distance between a second principal point of a lens system including cylindrical lens arrays 403a and 403b and a first principal point of a lens system including the cylindrical lens arrays 404a and 404b. Now, the positions of the principal points of the lenses are considered. If light enters one lens, which is one of mass-produced lenses with a small lens thickness, for example, a lens appearing in catalogs of laser manufactures, a first principal point and a second principal point of the lens both exist within a lens or on a lens surface.

The first principal point and the second principal point of the lens are defined as follows. The lens has two principal points as well as a focal point, which are a first principal point and a second principal point, and the first principal point is as follows. If it is assumed that when a ray having passed through a front side (left side) focal point (i.e., a ray traveling in parallel with an optical axis after passing through a lens) passes through the lens, the ray is refracted once at a virtual line instead of refracting twice at top and rear surfaces of the lens, the virtual plane can be defined in fact and is referred to as a first principal plane, and an intersection of the plane and the optical axis is referred to as the first principal point.

In other words, a virtual plane in the case that when the ray entering the lens in parallel with the optical axis from the right side passes through the lens, the ray is refracted once at a virtual line instead of refracting twice at the top and rear surfaces of the substrate is referred to as a first principal plane, and an intersection of the plane and the optical axis is referred to as a first principal point. On the contrary, a virtual plane in the case that when the ray having passed through a back side (right side) focal point actually passes through the lens, the ray is refracted once at the virtual plane instead of refracting twice at the top and rear surfaces of the substrate is referred to as a second principal plane, and an intersection of the plane and the optical axis is referred to as a second principal point.

In contrast, in the case of using a lens system in which lenses are combined, the position where the principal point is formed varies significantly depending on the lens curvature or the distance between the lenses, and is sometimes formed outside the lens. For example, as shown in FIG. 2A, if a first lens 201 is a convex lens and a second lens 202 is a concave lens, the principal point is formed ahead of the first lens 201. On the other hand, if a first lens 203 is a concave lens and a second lens 204 is a convex lens, the principal point is formed behind the second lens.

Therefore, as compared with the case of using one lens, the position of the second principal point moves ahead of the lens system in the case of using the lens system shown in FIG. 2A, while the position of the first principal point moves behind the lens system in the case of using the lens system shown in FIG. 2B. As thus described, it has been confirmed that the position of the principal point can be controlled by using the lens system including a plurality of lenses. The above description is made on the items for helping understanding of the present invention. Now, Embodiment Mode of the present invention will be described in detail based on the above description.

Embodiment Mode of the present invention will hereinafter describe an embodiment mode of a beam homogenizer in detail and also briefly describe an embodiment mode of a laser irradiation apparatus. The present invention is not limited by the description of the embodiment modes and is specified by the scope of claims. Moreover, it is easily understood by those skilled in the art that the mode and detail can be variously changed without departing from the spirit and scope of the present invention. In the structure of the present invention hereinafter shown, the reference numeral indicating the same thing is used in common in different figures.

First, an embodiment mode of a beam homogenizer will be described with reference to FIGS. 3A and 3B. FIG. 3A shows a beam homogenizer with the same structure as that in FIG. 1, in which a second principal point X of the cylindrical lens array 101 is formed at a position A and a first principal point Y of the cylindrical lens array 102 is formed at a position B, and the distance between the second principal point X and the first principal point Y becomes f2. Meanwhile, FIG. 3B shows a beam homogenizer including the lens system shown in FIGS. 2A and 2B.

A lens system including a cylindrical lens array 301 and a cylindrical lens array 302 is referred to as a first lens system (corresponding to a front side array lens of an optical path shortened type), and a lens system including a cylindrical lens array 303 and a cylindrical lens array 304 is referred to as a second lens system (corresponding to a back side array lens of an optical path shortened type). The lens curvature and the distance between the lenses (the distance between a second principal point of the cylindrical lens array 301 and a first principal point of the cylindrical lens array 302) in the first lens system are set so that the composite focal length becomes f1. Similarly to the lens system shown in FIG. 2A, a laser beam enters a concave lens after a convex lens.

Thus, a second principal point C of the first lens system is formed ahead of the cylindrical lens array 301. Therefore, the first lens system can be moved back in order to match the second principal point X of the cylindrical lens array 101 to the second principal point C of the first lens system. That is to say, it is possible to shorten the optical path length by the distance of the movement of the second principal point of the first lens system.

Moreover, the lens curvature and the distance between the lenses (the distance between the cylindrical lens array 303 and the cylindrical lens array 304) in the second lens system are set so that the composite focal length becomes f2. Similarly to the lens system shown in FIG. 2B, a laser beam enters a convex lens after a concave lens. Thus, a first principal point D of the second lens system is formed behind the cylindrical lens array 304. Therefore, the second lens system can be moved ahead in order to match the second principal point Y of the cylindrical lens array 102 to the first principal point D of the second lens system.

As described with reference to FIG. 1, since the distance between the cylindrical lens array 102 and the cylindrical lens 103 is not particularly limited, the cylindrical lens 305 can be made closer to the second lens system by the distance of the movement of the second lens system. That is to say, if the position of the cylindrical lens 305 is fixed, the first lens system and the second lens system can be moved by the distance of the movement of the first principal point of the second lens system, and accordingly the optical path length can be shortened by the distance of the movement of the first principal point of the second lens system.

In the beam homogenizer shown in FIG. 3B, combined cylindrical lens arrays are used as the front side array lens and the back side array lens. This is the preferred mode of the present invention; however, at least one combined cylindrical lens array is necessary in the beam homogenizer of the present invention, and for example the front side array lens may be replaced by one cylindrical lens array, i.e., an array lens of an optical path unshortened type, as shown in FIGS. 5A and 5B which illustrate one mode of a laser irradiation apparatus.

Although not shown, the back side array lens instead of the front side array lens may be replaced by one cylindrical lens array, i.e., an array lens of an optical path unshortened type. Even in this case, since one combined cylindrical lens array is employed, it is possible to shorten the optical path length and reduce the size of the optical system. However, the optical path length can be shortened more and the optical system can be reduced in size more by using two combined cylindrical lens arrays like in the beam homogenizer shown in FIG. 3B.

Although the beam homogenizer of the present invention is used to homogenize the beam in the short-side direction in this embodiment mode, the beam homogenizer of the present invention can be used to homogenize the beam in the long-side direction and also can be used to homogenize the beam in both of the short-side direction and the long-side direction. In the beam homogenizer shown in FIG. 3B, the beams divided by both of the front side and back side combined cylindrical lens arrays are combined by the cylindrical lens 305 provided just behind them, whereby the energy distribution of the beam is homogenized.

As for an embodiment mode of a laser irradiation apparatus, two kinds of modes are described briefly with reference to FIGS. 4A and 4B, and FIGS. 5A and 5B. FIGS. 4A and 4B show a laser irradiation apparatus using the beam homogenizer shown in FIG. 3B. That is to say, in this laser irradiation apparatus, two combined cylindrical lens arrays (the front side combined cylindrical lens arrays 403a and 403b and the back side combined cylindrical lens arrays 404a and 404b) are used and the combined cylindrical lens arrays 403a and 403b, and 404a and 404b correspond to the front side array lens of an optical path shortened type and the back side array lens of an optical path shortened type in the beam homogenizer of the present invention. This corresponds to the first mode described above.

Thus, the beam is divided in the short-side direction, and the divided beams are condensed (combined) by the cylindrical lens 407, so that the energy distribution in the short-side direction is homogenized. Moreover, cylindrical lens arrays 405a and 405b for dividing the beam in the long-side direction are arranged ahead of the cylindrical lens 407 in the traveling direction of the beam, and the beams divided in the long-side direction by these cylindrical lens arrays 405a and 405b are combined by the cylindrical lens 406, whereby the energy distribution thereof is homogenized.

In the laser irradiation apparatus shown in FIGS. 4A and 4B, the cylindrical lens 407 corresponds to a condensing lens of the beam homogenizer of the present invention. Although the cylindrical lens 407 is arranged behind the cylindrical lens 406 and the cylindrical lens arrays 405a and 405b that form the beam homogenizer for the long-side direction in FIGS. 4A and 4B, the cylindrical lens 407 may be arranged ahead of the cylindrical lens arrays 405a and 405b differently from the arrangement shown in the figure.

A laser irradiation apparatus shown in FIGS. 5A and 5B is of a different mode from the laser irradiation apparatus shown in FIGS. 4A and 4B, and a beam homogenizer used in FIGS. 5A and 5B has a cylindrical lens array 503, which is an incomposite array lens of an optical path unshortened type, instead of the front side combined cylindrical lens array in the beam homogenizer shown in FIG. 3B. However, even in this case, since one combined cylindrical lens is used, it is possible to shorten the optical path length and reduce the size of the optical system. It is to be noted that the beam homogenizer used in the laser irradiation apparatus in FIGS. 5A and 5B corresponds to the third mode.

However, in this case, the optical path length is not shortened that much as compared with the case of using combined cylindrical lens arrays which are array lenses of an optical path shortened type as the front side and back side array lenses like in the beam homogenizer shown in FIGS. 4A and 4B, because the array lens is used on only one side. In other words, if combined cylindrical lens arrays which are array lenses of an optical path shortened type are used as the front side and back side array lenses like in the beam homogenizer shown in FIGS. 4A and 4B, the optical path length can be shortened as compared with the case of using a combined cylindrical lens array which is an array lens of an optical path shortened type as only the array lens on one side shown in FIGS. 5A and 5B. The two modes of the laser irradiation apparatus will be specifically described in the following embodiment.

Embodiment 1

Embodiments of the present invention are hereinafter described with reference to the drawings. However, the present invention is not limited by the description of Embodiments but specified by the scope of claims. It is easily understood by those skilled in the art that the modes and details can be variously changed without departing from the spirit and scope of the present invention. In the structures of the present invention described hereinafter, the reference numeral indicating the same part is used in common in different drawings.

FIGS. 4A and 4B show an optical system employed in Embodiment 1. Embodiment 1 is described with reference to a side view of FIG. 4B. This side view includes in its paper a short-side direction of a linear beam spot formed by the optical system. A laser beam emitted from a XeCl excimer laser 401 travels in a direction indicated by arrows in FIGS. 4A and 4B. First, the laser beam is expanded by spherical lenses 402a and 402b. This structure is not necessary if the beam spot emitted from the laser oscillator 401 is sufficiently large. The laser beam emitted from the laser oscillator is divided in the short-side direction by cylindrical lens arrays which will be described below.

As described above, the long-side direction and the short-side direction are the same as a direction where the width of a linear beam spot on an irradiation surface 409 is longer and a direction where the width thereof is shorter, respectively. A surface of a lens where light enters is referred to as a first surface while a surface of a lens where light is emitted is referred to as a second surface. The sign of radius of curvature is positive when the center of curvature is on a side where light is emitted with respect to the lens surface and negative when the center of curvature is on a side where light enters with respect to the lens surface. Moreover, the lenses used in this embodiment are manufactured with synthetic quartz having high transmittance and laser resistance against a XeCl excimer laser with a wavelength of 308 nm.

The cylindrical lens array 403a has eleven cylindrical lenses arranged in a direction of the curvature, each of which has a first surface with a radius of curvature of 146.8 mm, a second surface which is plane, a thickness of 5 mm, and a width of 4 mm in the short-side direction. The cylindrical lens array 403b has eleven cylindrical lenses arranged in a direction of the curvature, each of which has a first surface which is plane, a second surface with a radius of curvature of 160 mm, a thickness of 5 mm, and a width of 4 mm in the short-side direction. The distance between a second surface of the cylindrical lens array 403a and a first surface of the cylindrical lens array 403b is 85 mm, the composite focal length of the cylindrical lens array 403a and the cylindrical lens array 403b is 837.5 mm, and a second principal point of a lens system including the two lenses is formed at 162.4 mm ahead of the first plane of the cylindrical lens array 403a.

The cylindrical lens array 404a has eleven cylindrical lenses arranged in a direction of the curvature, each of which has a first surface with a radius of curvature of −262.4 mm, a second surface which is plane, a thickness of 5 mm, and a width of 4 mm in the short-side direction. The cylindrical lens array 404b has eleven cylindrical lenses arranged in a direction of the curvature, each of which has a first surface which is plane, a second surface with a radius of curvature of −200 mm, a thickness of 5 mm, and a width of 4 mm in the short-side direction. When the cylindrical lens arrays 404a and 404b are arranged so that the distance between a second surface of the cylindrical lens array 404a and a first surface of the cylindrical lens array 404b is 60 mm, the composite focal length of the cylindrical lens arrays 404a and 404b is 1139.8 mm, and a first principal point of a lens system including the two lenses is formed at about 118 mm behind a second surface of the cylindrical lens array 404b.

This composite focal length (f) and the distance (z) from a second principal point of the second lens to a second principal point of the combined system can be calculated from known formulas, and for example, the composite focal length of the combined lens including two lenses can be obtained from the following formula (2) and the distance can be obtained from the following formula (3), where L is a distance of the principal point of the two lenses.

$$1/f = 1/f1 + 1/f2 - L/f1f2 \quad \text{formula (2)}$$

$$z = -f2L/(f1+f2-L) \quad \text{formula (3)}$$

The cylindrical lens array 404a is arranged at 694.4 mm behind a second surface of the cylindrical lens array 403b so that the distance between a second principal point of the front side combined cylindrical lens array including the cylindrical lens array 403a and the cylindrical lens array 403b and a first principal point of the back side combined cylindrical lens array including the cylindrical lens array 404a and the cylindrical lens array 404b is 1139.8 mm, which is equal to the composite focal length of the cylindrical lens array 404a and the cylindrical lens array 404b.

The spots divided by the cylindrical lens arrays 403a, 403b, 404a, and 404b are condensed by the cylindrical lens 407 which has a first surface with a radius of curvature of 486 mm, a second surface that is plane, and a thickness of 20 mm and which is provided at 1815 mm behind the second surface of the cylindrical lens array 404b. Thus, a plane 410 with homogeneous energy distribution which has a length of 3.5 mm in the short-side direction is formed at about 1000 mm behind a second surface of the cylindrical lens 407.

As thus described, it is possible to shorten the optical path length by about 283.6 mm as compared with the case of replacing the convex cylindrical lens array 403a and the concave cylindrical lens array 403b with one convex cylindrical lens array having a first surface that is curved, a second surface that is plane, a thickness of 5 mm, and the same focal length as the composite focal length of the convex cylindrical lens array 403a and the concave cylindrical lens array 403b and replacing the concave cylindrical lens array 404a and the convex cylindrical lens array 404b with a cylindrical lens array having a first surface that is plane, a second surface that is curved, a thickness of 5 mm, and the same focal length as the composite focal length of the concave cylindrical lens array 404a and the convex cylindrical lens array 404b. Thus, a combination of the cylindrical lens arrays 403a, 403b, 404a, and 404b and the cylindrical lens 407 serves as a beam homogenizer for the short-side direction, and this corresponds to the beam homogenizer of the present invention.

The plane 410 with the homogeneous energy distribution formed by the beam homogenizer is projected to an irradiation surface provided at 220 mm behind a second surface of a doublet cylindrical lens 408b provided at 1250 mm behind the plane with the homogenous energy distribution, by the doublet cylindrical lens 408b. In other words, the homogeneous plane 410 and the irradiation surface 409 are in a conjugate relation with respect to the doublet cylindrical lens 408. This homogenizes the energy distribution of the linear beam spot in the short-side direction and determines the length thereof in the short-side direction. The doublet cylindrical lens 408 includes a cylindrical lens 408a and a cylindrical lens 408b.

The cylindrical lens 408a has a first surface with a radius of curvature of 125 mm, a second surface with a radius of curvature of 77 mm, and a thickness of 10 mm. The cylindrical lens 408b has a first surface with a radius of curvature of 97 mm, a second surface with a radius of curvature of −200 mm, and a thickness of 20 mm. The distance between the second surface of the cylindrical lens 408a and the first surface of the cylindrical lens 408b is 5.5 mm. When the homogeneity of the beam spot on the irradiation surface is not required that much or when an F-number (F=focal length of the lens/entrance pupil diameter) of the doublet cylindrical lens is very large, a singlet cylindrical lens may be used.

Next, a plan view of FIG. 4A is described. The plan view includes in its paper a long-side direction of the linear beam spot formed by the optical system. The spot of the laser beam emitted from the laser oscillator 401 is divided in the long-side direction by the cylindrical lens arrays 405a and 405b. The cylindrical lens array 405a has twelve cylindrical lenses arranged in a direction of the curvature, each of which has a first surface with a radius of curvature of 40 mm, a second surface that is plane, a thickness of 3 mm, and a width of 9 mm in the long-side direction. The cylindrical lens array 405b has twelve cylindrical lenses arranged in a direction of the curvature, each of which has a first surface that is plane, a second surface with a radius of curvature of −55 mm, a thickness of 3 mm, and a width of 9 mm in the long-side direction.

The cylindrical lens arrays 405a and 405b are arranged so that the distance between a second principal point of the cylindrical lens array 405a and a first principal point of the cylindrical lens array 405b is 113.3 mm, which is equal to the focal length of the cylindrical lens array 405b. The spots divided by the cylindrical lens arrays 405a and 405b are superposed on the irradiation surface 409 by the cylindrical lens 406 which has a first surface that is plane and a second surface with a radius of curvature of −2140 mm and which is provided at 82 mm behind the second surface of the cylindrical lens array 405b. This homogenizes the energy distribution of the linear beam spot in the long-side direction and determines the length thereof in the long-side direction.

It is possible to decrease a portion where the energy attenuates at opposite ends of the linear beam spot in the long-side direction by using the cylindrical lens 406. However, the focal length of the lens may be extremely long because of the structure of the apparatus. In such a case, the lens does not always have to be used because the advantageous effect of this lens decreases. Thus, a combination of the cylindrical lens arrays 405a and 405b and the cylindrical lens 406 corresponds to a beam homogenizer in the long-side direction but does not correspond to the beam homogenizer of the present invention.

Figure 7A:
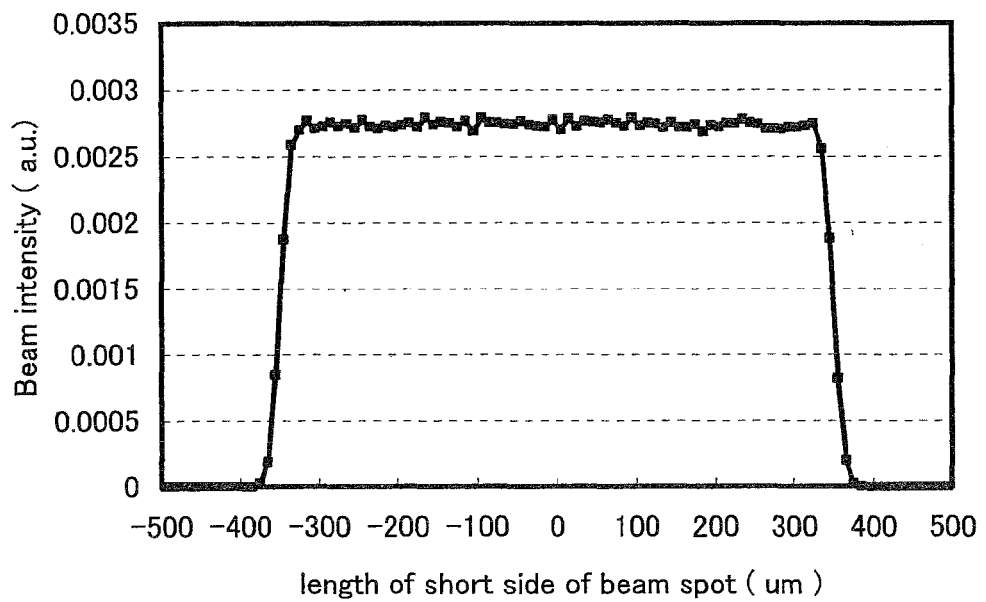
FIGS. 7A and 7B show a result of calculation on a laser irradiation apparatus of the present invention shown in FIGS. 4A and 4B by optical design software.
Figure 7B:
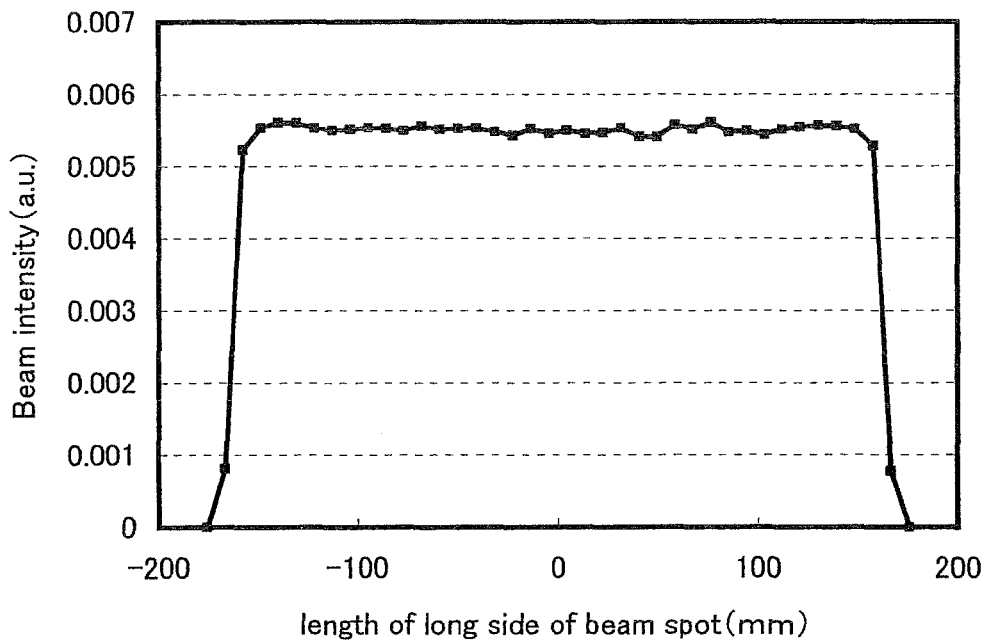

As thus described, a linear beam spot with homogeneous energy distribution having a length of 700 μm in the short-side direction and 300 mm in the long-side direction can be formed on the irradiation surface 409 by using the optical system shown in FIGS. 4A and 4B. FIGS. 7A and 7B show a result of ray trace calculation of the optical system shown in FIGS. 4A and 4B obtained by using optical design software. The vertical axis shows the intensity of the obtained beam spot while the horizontal axis shows the lengths of a short side and a long side of the beam spot.

The laser oscillator used in combination with the beam homogenizer of the present invention preferably has high output power and a wavelength range which is sufficiently absorbed in a semiconductor film. In the case of using a silicon film as a semiconductor film, the wavelength of the laser beam emitted from the laser oscillator is preferably 600 nm or shorter. As the laser oscillator emitting such a laser beam, for example, an excimer laser, a YAG laser (harmonic), or a glass laser (harmonic) is given.

Moreover, as a laser oscillator emitting a laser beam with an appropriate wavelength for crystallizing a silicon film, for example, a $YVO_4$ laser (harmonic), a YLF laser (harmonic), an Ar laser, a $GdVO_4$ laser (harmonic), or a Ti:sapphire laser (harmonic) is given. The optical system of the present invention may be used in the air or under a nitrogen or argon atmosphere in order to suppress breakdown or damage of a lens surface due to a laser beam with high energy.

Embodiment 2

This embodiment shows an example of a different optical system from the optical system described above, with reference to FIGS. 5A and 5B. In FIGS. 5A and 5B, a laser beam travels along the same optical path as that in the optical system shown in FIGS. 4A and 4B described in Embodiment 1 except the optical path in a cylindrical lens array that forms a homogenizer in a short-side direction. A beam homogenizer shown in this embodiment is described with reference to a side view of FIG. 5B. It is to be noted that the lenses shown in this embodiment are made of synthetic quartz having high transmittance and laser resistance against a XeCl excimer laser.

The laser beam emitted from the laser oscillator is divided by a cylindrical lens array 503 hereinafter described in a short-side direction. The cylindrical lens array 503 has eleven cylindrical lenses arranged in a direction of the curvature, each of which has a first surface with a radius of curvature of 412.8 mm, a second surface that is plane, a thickness of 5 mm, and a width of 4 mm in the short-side direction. A second principal point of the cylindrical lens array 503 is formed inside the lens at about 3.6 mm from a second surface of the cylindrical lens.

The cylindrical lens array 404a has eleven cylindrical lenses arranged in a direction of the curvature, each of which has a first surface with a radius of curvature of −262.4 mm, a second surface that is plane, a thickness of 5 mm, and a width of 4 mm in the short-side direction. The cylindrical lens array 404b has eleven cylindrical lenses arranged in a direction of the curvature, each of which has a first surface that is plane, a second surface with a radius of curvature of −200 mm, a thickness of 5 mm, and a width of 4 mm in the short-side direction. The distance between a second surface of the cylindrical lens array 404a and a first surface of the cylindrical lens array 404b is 60 mm, the composite focal length of the cylindrical lens array 404a and the cylindrical lens array 404b is 1139.8 mm, and the first principal point of a lens system including the two lenses is formed at about 118 mm behind the second surface of the cylindrical lens array 404b.

The cylindrical lens array 404a is arranged at 948.2 mm behind the second surface of the cylindrical lens array 503 so that the distance between the second principal point of the cylindrical lens array 503 and the first principal point of the lens system including the cylindrical lens array 404a and the cylindrical lens array 404b is 1139.8 mm, which is equal to the composite focal length of the cylindrical lens array 404a and the cylindrical lens array 404b.

The spots divided by the cylindrical lens arrays 503, 404a, and 404b are condensed by the cylindrical lens 407 which has a first surface with a radius of curvature of 486 mm, a second surface that is plane, and a thickness of 20 mm and which is provided at 1815 mm behind the second surface of the cylindrical lens array 404b, thereby forming a plane with homogeneous energy distribution having a length of 3.6 mm in the short-side direction at 1000 mm behind the second surface of the cylindrical lens 405. It is possible to shorten the optical path length by about 119.6 mm as compared with the case of replacing the concave cylindrical lens array 404a and the convex cylindrical lens array 404b with one convex cylindrical lens array having the same focal length as the composite focal length of the cylindrical lens arrays 404a and 404b.

Embodiment 3

This embodiment will show an example of a different optical system from the optical system shown above, with reference to FIGS. 8A and 8B. Similarly to another embodiment, the lenses shown in this embodiment are made of synthetic quartz having high transmittance and laser resistance against a XeCl excimer laser; however, the material of the lens can be selected appropriately in accordance with a laser and a wavelength range to be used. FIG. 8A shows only an optical system for homogenizing the energy density distribution of the beam in the short-side direction. The optical system for homogenizing the energy density distribution in the long-side direction is used similarly to another embodiment.

The cylindrical lens arrays 403a and 403b used here correspond to the front side array lens of an optical path shortened type in the beam homogenizer of the present invention, and FIG. 8B shows an optical system in which a cylindrical lens array 801 with both of its first surface and second surface having different curvature is used instead of the cylindrical lens arrays 403a and 403b. The cylindrical lens array 801 has a first surface with a radius of curvature of 47.8 mm, a second surface with a radius of curvature of 50.5 mm, a thickness of 10 mm, and a focal length of 832.8 mm. A second principal point of the cylindrical lens array 801 is formed at 56.9 mm from a second surface toward a first surface, i.e., 46.9 mm ahead of the first surface.

The cylindrical lens array 801 is arranged so that the distance between the second principal point of the cylindrical lens array 801 and the first principal point of the lens system (hereinafter referred to as a second lens system) including the cylindrical lens array 404a and the cylindrical lens array 404b is 1139.8 mm, which is equal to the composite focal length of the second lens system. In other words, the distance between the second surface of the cylindrical lens array 801 and the first surface of the cylindrical lens array 404a is 894.9 mm.

It is possible to shorten the optical path length by 48.5 mm by using the optical system shown in FIGS. 8A and 8B as compared with the case of using, instead of the cylindrical lens array 801 having curved surfaces on its opposite sides, one planoconvex cylindrical lens array (with a first surface curved and a thickness of 5 mm) with the same focal length as the cylindrical lens array 801. Although this embodiment has shown an example of homogenizing the energy density distribution in the short-side direction, the energy density distribution in the long-side direction or the energy density distribution in the long-side and short-side directions may be homogenized.

As thus described, this embodiment provides an advantageous effect that the optical path length can be shortened as compared with the case of using one planoconvex lens when the cylindrical lens array 403a and the cylindrical lens array 403b are replaced by the cylindrical lens array 801 with opposite surfaces curved. Moreover, a similar advantageous effect can be obtained even when the cylindrical lens arrays 404a and 404b are replaced by the cylindrical lens array 801 with opposite surfaces curved.

Further, the cylindrical lens arrays 403a and 403b may be replaced by the cylindrical lens array 801 with opposite surfaces curved, and moreover the cylindrical lens arrays 404a and 404b may be replaced by one cylindrical lens array with opposite surfaces curved. In such a case, an effect of shortening an optical path can be obtained by replacing the front side and back side lens arrays. That is to say, an effect of shortening an optical path in the case of using a front side array lens of an optical path shortened type and a back side array lens of an optical path shortened type can be obtained.

Embodiment 4

This embodiment will show an example in which the width of a beam is adjusted by using the optical system described in another embodiment such as Embodiment 1. The lenses shown in this embodiment are made of synthetic quartz having high transmittance and laser resistance against a XeCl excimer laser; however, the material of the lenses can be appropriately selected in accordance with a laser and a wavelength range to be used. FIG. 9A shows only an optical system related to the short-side direction of the beam among the optical system shown FIG. 4B. The optical system related to the long-side direction of the beam may be similar to that in another embodiment. A point 410 at which the energy distribution is homogeneous is the focal point of the cylindrical lens 407.

The beam width D at this point is expressed with the following formula (4) where d is the width of each lens in the short-side direction of the cylindrical lens arrays 403a, 403b, 404a, and 404b; f404 is the composite focal length of the cylindrical lens arrays 404a and 404b; and f407 is the focal length of the cylindrical lens 407.

$$D = (f407/f404) \times d \qquad \text{formula (4)}$$

By assigning f404=1139.8 mm, f407=1000.8 mm, and d=4 mm, D=3.5 mm is obtained from the above formula (4). When this beam is projected using a lens with a magnification of 5, a beam of 700 μm wide can be formed.

Here, as shown in FIG. 9B, the width of the beam formed at the point 410 at which the energy density distribution is homogeneous can be changed by changing the distance between the second surface of the cylindrical lens array 404a and the first surface of the cylindrical lens array 404b. However, if the distance between these lenses is changed, the first principal point of a lens system including the cylindrical lens arrays 404a and 404b (second lens system) moves. Therefore, it is necessary to move another lens so that the distance from the second principal point of a lens system including the cylindrical lens arrays 403a and 403b (hereinafter referred to as a first lens system) to the first principal point of the second lens system is equal to f404.

For example, in order to change the width of the beam formed by the optical system shown in FIG. 9A, the cylindrical lens array 404a is moved by +15.5 mm in a z-direction in FIGS. 9A and 9B, so that the distance between the second surface of the cylindrical lens array 404a and the first surface of the cylindrical lens array 404b is shortened from 60 mm to 44.5 mm. By this operation, the composite focal length of the second lens system is changed from 1139.8 mm to 1238.2 mm. A z-axis is parallel to the optical axis, and a direction along which the light travels is denoted as positive (+).

With the movement of the cylindrical lens array 404a, the first principal point of the second lens system moves. The first lens system is wholly moved by −113.6 mm in the z-axis direction of FIGS. 9A and 9B so that the distance between the second principal point of the first lens system and the first principal point of the second lens system is equal to the composite focal length of the second lens system. By moving the cylindrical lens array 404a, the focal length f404 becomes 1238.2 mm.

Then, as can be confirmed by assigning in the formula (1), a beam with a width of 3.23 mm is formed at the point 410 where the energy density distribution is homogeneous. Moreover, a beam with a length of 646 μm can be formed by projecting the beam onto another plane with a lens having a magnification of 5. Thus, when the beam homogenizer of the present invention is used, the width of the beam to be formed can be changed by moving the lens position. Although this embodiment has shown the optical system used in Embodiment 1, this embodiment can be combined with another embodiment as well.

Embodiment 5

This embodiment will show an example of using a fly-eye lens (also referred to as an integrator) as a lens for homogenizing a beam and shortening optical path length. The fly-eye lens is an aggregation of lenses with a compound eye structure, and is formed by arranging a group of one kind of lens elements (like a rod lens) each having opposite surfaces curved or formed by arranging a group of lens elements in such a way that a group of lens elements on an incidence side and lenses on an emission side face each other. The fly-eye lens has a function to project light having entered the lens surface on an incidence side onto the irradiation surface by passing though the emission side of the lens.

When the respective projected light is summed on the irradiation surface, the intensity distribution on the irradiation surface is homogenized. The shape of the beam spot on the irradiation surface reflects the shape of the lens element. This embodiment shows an example of using a fly-eye lens whose lenses have square shapes; however, a fly-eye lens whose lenses have rectangular or triangle shapes may also be used similarly.

Similarly to another embodiment, the lenses shown in this embodiment are made of synthetic quartz having high transmittance and laser resistance against a XeCl excimer laser; however, the material of the lens can be appropriately selected in accordance with a laser or a wavelength range to be used. FIGS. 10A and 10B show an optical system including fly-eye lenses as a homogenizer acting in a first direction of the beam and a second direction perpendicular to the first direction. It is to be noted that FIG. 10A is a plan view while FIG. 10B is a side view. Since the shape of each lens which forms the fly-eye lens is square in this embodiment, the beam is homogenized in the same way in the first direction and the second direction.

A laser beam emitted from a XeCl excimer laser oscillator 1001 travels along a direction indicated by an arrow in FIGS. 10A and 10B. First, the laser beam is expanded by spherical lenses 1002a and 1002b. This structure is not necessary if the beam diameter of the laser beam emitted from the laser oscillator 1001 is large. A spot of the laser beam emitted from the laser oscillator 1001 is divided in the first direction and the second direction by a fly-eye lens hereinafter described.

Figure 11A:
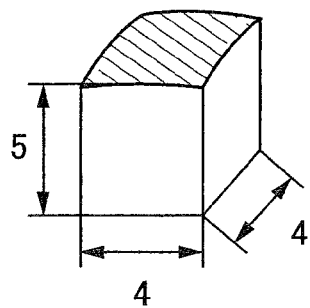
FIGS. 11A to 11C show structures of a fly-eye lens used in Embodiment 5.
Figure 11B:
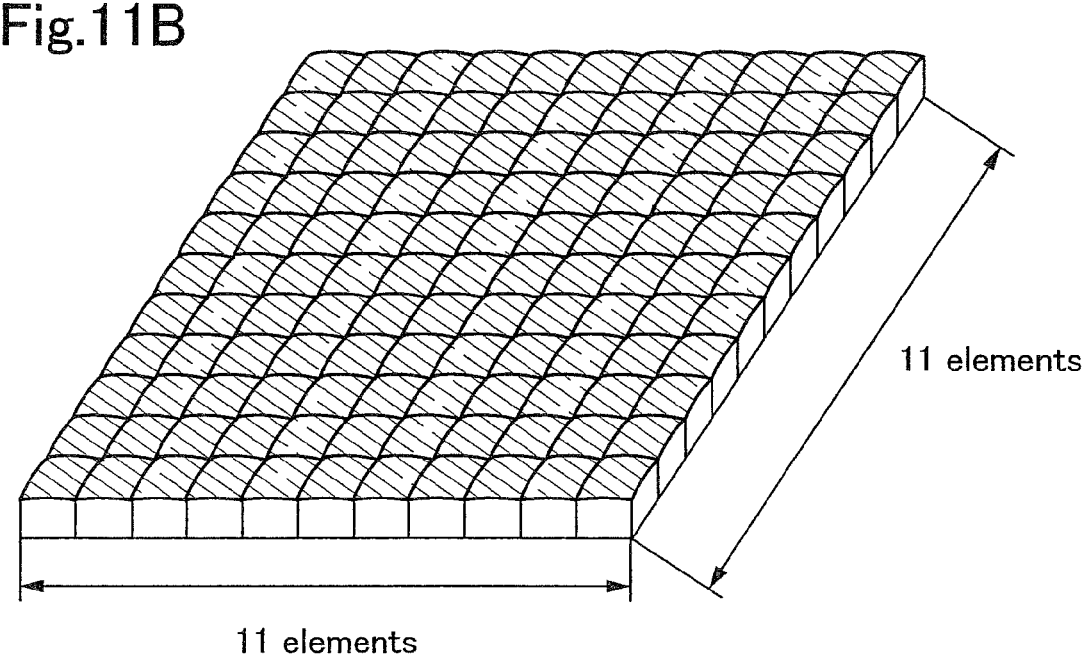
Figure 11C:
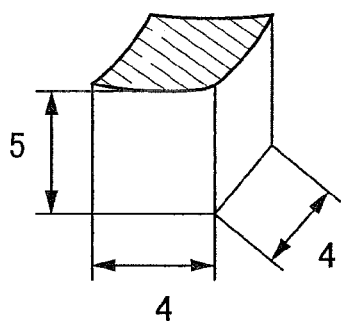

The fly-eye lens 1003a has 11×11 spherical lenses arranged in a first direction and a second direction as shown in FIG. 11B, each of which has a first surface with a radius of curvature of 146.8 mm, a second surface that is plane, a thickness of 5 mm, a length of 4 mm in the first and second directions as shown in FIG. 11A. The fly-eye lens 1003b has 11×11 spherical lenses arranged in the first direction and the second direction as shown in FIG. 11B, each of which has a first surface that is plane, a second surface with a radius of curvature of 160 mm, a thickness of 5 mm, and a length of 4 mm in the first and second directions.

The distance between a second surface of the fly-eye lens 1003a and a first surface of the fly-eye lens 1003b is 85 mm, and the composite focal length of the fly-eye lens 1003a and the fly-eye lens 1003b is 837.5 mm. A second principal point of a lens system including these two lenses is formed at 162.4 mm ahead of the first surface of the fly-eye lens 1003a. The fly-eye lens 1004a has 11×11 spherical lenses arranged in the first direction and the second direction, each of which has a first surface with a radius of curvature of −262.4 mm, a second surface that is plane, a thickness of 5 mm, and a length of 4 mm in the first and second directions. The fly-eye lens 1004b has 11×11 spherical lenses arranged in the first direction and the second direction, each of which has a first surface that is plane, a second surface with a radius of curvature of −200 mm, a thickness of 5 mm, and a length of 4 mm in the first and second directions.

When the fly-eye lenses 1004a and 1004b are arranged so that the distance between a second surface of the fly-eye lens 1004a and a first surface of the fly-eye lens 1004b is 60 mm, the composite focal length of the fly-eye lenses 1004a and 1004b becomes 139.8 mm and a first principal point of a lens system including these two lenses is formed at about 118 mm behind the second surface of the fly-eye lens 1004b. It is to be noted that in a combined lens system including two lenses, the focal length f and the distance z from a second principal point of a second lens to a second principal point of the combined lens system can be calculated from the formulas (2) and (3).

The fly-eye lens 1004a is arranged at 694.4 mm behind the second surface of the fly-eye lens 1003b so that the distance between a second principal point of a front side combined lens including the fly-eye lens 1003a and the fly-eye lens 1003b and a first principal point of a back side combined lens including the fly-eye lens 1004a and the fly-eye lens 1004b is 1139.8 mm which is equal to the composite focal length of the fly-eye lens 1004a and the fly-eye lens 1004b. The spots divided by the fly-eye lenses 1003a, 1003b, 1004a, and 1004b are condensed by a spherical lens 1005 which has a first surface with a radius of curvature of 486 mm, a second surface that is plane, and a thickness of 20 mm and which is provided at 1815 mm behind the second surface of the fly-eye lens 1004b, thereby forming a square plane 1008 with a length of 3.5 mm on each side at which the energy distribution is homogeneous at about 1000 mm behind a second surface of the spherical lens 1005.

It is possible to shorten the optical path length by about 283.6 mm as compared with the case of replacing the fly-eye lenses 1003a and 1003b with one fly-eye lens having a first surface which is curved, a second surface which is plane, a thickness of 5 mm, and the same focal length as the composite focal length of the fly-eye lenses 1003a and 1003b and replacing the fly-eye lenses 1004a and 1004b with one fly-eye lens having a first surface which is plane, a second surface which is curved, a thickness of 5 mm, and the same focal length as the composite focal length of the fly-eye lenses 1004a and 1004b. A combination of the fly-eye lenses 1003a, 1003b, 1004a, and 1004b and the spherical lens 1005 corresponds to the beam homogenizer of the present invention.

A plane 1008 formed by the beam homogenizer of the present invention at which the energy distribution is homogeneous is projected to an irradiation surface 1007 provided at 220 mm behind a second surface of a spherical lens 1006b by a doublet lens 1006 arranged at 1250 mm behind the plane 1008 at which the energy distribution is homogeneous. In other words, the plane 1008 at which the energy distribution is homogeneous and the irradiation surface 1007 are in a conjugate relation with respect to the doublet lens 1006. This homogenizes the energy distribution of the square beam spot in the first and second directions, and determines the length thereof in the first and second directions. The doublet lens 1006 includes a spherical lens 1006a and the spherical lens 1006b.

The spherical lens 1006a has a first surface with a radius of curvature of 125 mm, a second surface with a radius of curvature of 77 mm, and a thickness of 10 mm, while the spherical lens 1006b has a first surface with a radius of curvature of 97 mm, a second surface with a radius of curvature of −200 mm, and a thickness of 20 mm. The distance between a second surface of the spherical lens 1006a and a first surface of the spherical lens 1006b is 5.5 mm. If the homogeneity of the beam spot on the irradiation surface 1007 is not required that much or if an F-number (F=lens focal length/incidence pupil diameter) of the doublet lens is very large, a singlet lens may be used alternatively.

Thus, a square beam spot with homogeneous energy distribution having a length of 700 μm on each side can be formed on the irradiation surface 1007 by using the optical system shown in FIGS. 10A and 10B. The laser oscillator used in combination with the beam homogenizer of the present invention preferably has high output power and a wavelength range which is sufficiently absorbed in a semiconductor film. In the case of using a silicon film as a semiconductor film, the wavelength of a laser beam emitted from a laser oscillator is preferably 600 nm or shorter in consideration of an absorption ratio.

As a laser oscillator emitting such a laser beam, for example, an excimer laser, a YAG laser (harmonic), a glass laser (harmonic), a $YVO_4$ laser (harmonic), a YLF laser (harmonic), an Ar laser, a $GdVO_4$ laser (harmonic), or a Ti: sapphire laser (harmonic) is given. In addition to these lasers, other lasers may be used. A laser beam may be converted into a harmonic with a wavelength of 600 nm or shorter by using a known non-linear optical element. The optical system of the present invention may be used in the air or under a nitrogen or argon atmosphere in order to suppress breakdown or damage of a lens surface due to a laser beam with high energy.

This embodiment has shown an example of using a spherical planoconvex lens and a spherical planoconcave lens as the elements constituting the fly-eye lens; however, a lens with both of its first and second surfaces curved or a lens with different curvature in the first and second directions may be used as well. If the lens with different curvature in the first and second directions is used, in the case of using a spherical lens as a condensing lens, the beam spot to be formed becomes rectangular. If a rectangular beam with an aspect ratio of 1 or more is to be formed, a toric lens or a crossed cylindrical lens with different curvature in the first and second directions may be used as the condensing lens instead of the spherical lens, and a cylindrical lens for condensing the beam only in the first direction and a cylindrical lens for condensing the beam only in the second direction may be arranged.

Moreover, although this embodiment shows an example of using the fly-eye lens having curvature on one side, one fly-eye lens with both of the first and second surfaces having curvature can be used instead of the fly-eye lenses 1003a and 1003b similarly to Embodiment 3. Even in this case, it is possible to shorten the optical path length as compared with the case of using, instead of the fly-eye lens with its opposite surfaces having curvature, a planoconvex fly-eye lens having the same focal length as the fly-eye lens with its opposite surfaces having curvature similarly to Embodiment 3. Moreover, a similar advantageous effect can be obtained even if the fly-eye lenses 1004a and 1004b are replaced by one fly-eye lens with its opposite surfaces having curvature.

Further, the fly-eye lenses 1003a and 1003b can be replaced by one fly-eye lens with its opposite surfaces having curvature and the fly-eye lenses 1004a and 1004b can be replaced by one fly-eye lens with its opposite surfaces having curvature. In such a case, an effect of shortening an optical path can be obtained by replacing the front side and back side lenses. That is to say, an effect of shortening an optical path in the case of using a front side array lens of an optical path shortened type and a back side array lens of an optical path shortened type can be obtained.

This application is based on Japanese Patent Application serial no. 2005-106392 filed in Japan Patent Office on 4, 1, in 2005, the entire contents of which are hereby incorporated by reference. The laser irradiation apparatus disclosed in this specification can be used for various purposes, for example, for crystallizing a semiconductor film. The semiconductor film crystallized in accordance with the laser irradiation of the present invention can be used as an active layer of a semiconductor device such as a thin film transistor. As an example, such a thin film transistor may be manufactured in accordance with the method disclosed in U.S. Patent Application Publication No. 2004/0256618 A1 by Imai et al. although not limited thereto. An entire disclosure of U.S. Patent Application Publication No. 2004/0256618 A1 is herein incorporated by reference.

What is claimed is:

1. A method of manufacturing a semiconductor device comprising:

forming a semiconductor film over a substrate;

crystallizing the semiconductor film by irradiating a laser beam homogenized by a beam homogenizer;

forming a semiconductor layer by patterning the semiconductor film;

forming a gate electrode over the semiconductor layer with a gate insulating film interposed therebetween; and doping an impurity element to the semiconductor layer selectively to form a source region and a drain region in the semiconductor layer, wherein the beam homogenizer comprises:

a first lens system in which a first convex lens and a first concave lens are combined;

a second lens system in which a second convex lens and a second concave lens are combined; and a condensing lens, wherein a focus of the first lens system is positioned between the first lens system and the second lens system, wherein a first principal point of the second lens system is positioned on a beam emission side of the second lens system, wherein a second principal point of the first lens system is positioned on a beam incidence side of the first lens system, and wherein the first lens system and the second lens system and the condensing lens are arranged along a same optical path in series.

2. The method of manufacturing a semiconductor device according to claim 1, wherein a distance between the second principal point of the first lens system and the first principal point of the second lens system is equal to a focal length of the second lens system.

3. The method of manufacturing a semiconductor device according to claim 1, wherein the substrate is a glass substrate.

4. The method of manufacturing a semiconductor device according to claim 1, wherein the laser beam is an Excimer laser light.

5. A method of manufacturing a semiconductor device comprising:

forming a semiconductor film over a substrate;

crystallizing the semiconductor film by irradiating a laser beam homogenized by a beam homogenizer;

forming a semiconductor layer by patterning the semiconductor film;

forming a gate electrode over the semiconductor layer with a gate insulating film interposed therebetween; and doping an impurity element to the semiconductor layer selectively to form a source region and a drain region in the semiconductor layer, wherein the beam homogenizer comprises:

a first lens system in which a convex lens and a concave lens are combined;

a second lens system; and a condensing lens;

wherein a focus of the first lens system is positioned between the first lens system and the second lens system, wherein a second principal point of the first lens system is positioned on a beam incidence side of the first lens system, and wherein the first lens system and the second lens system and the condensing lens are arranged along a same optical path in series.

6. The method of manufacturing a semiconductor device according to claim 5, wherein a distance between the second principal point of the first lens system and a first principal point of the second lens system is equal to a focal length of the second lens system.

7. The method of manufacturing a semiconductor device according to claim 5, wherein the substrate is a glass substrate.

8. The method of manufacturing a semiconductor device according to claim 5, wherein the laser beam is an Excimer laser light.

9. A method of manufacturing a semiconductor device comprising:

forming a semiconductor film over, a substrate;

crystallizing the semiconductor film by irradiating a laser beam homogenized by a beam homogenizer;

forming a semiconductor layer by patterning the semiconductor film;

forming a gate electrode over the semiconductor layer with a gate insulating film interposed therebetween; and doping an impurity element to the semiconductor layer selectively to form a source region and a drain region in the semiconductor layer;

wherein the beam homogenizer comprises:

a first lens system;

a second lens system in which a convex lens and a concave lens are combined; and a condensing lens;

wherein a focus of the first lens system is positioned between the first lens system and the second lens system, wherein a first principal point of the second lens system is positioned on a beam emission side of the second lens system, and wherein the first lens system and the second lens system and the condensing lens are arranged along a same optical path in series.

10. The method of manufacturing a semiconductor device according to claim 9, wherein a distance between a second principal point of the first lens system and the first principal point of the second lens system is equal to a focal length of the second lens system.

11. The method of manufacturing a semiconductor device according to claim 9, wherein the substrate is a glass substrate.

12. The method of manufacturing a semiconductor device according to claim 9, wherein the laser beam is an Excimer laser light.

* * * * *